(12) United States Patent
Scott et al.

(10) Patent No.: US 11,371,445 B2
(45) Date of Patent: Jun. 28, 2022

(54) SYSTEMS AND METHODS FOR VEHICULAR POWER GENERATION

(71) Applicant: CNGMOTIVE INC., Frankfort, IL (US)

(72) Inventors: David I. Scott, Frankfort, IL (US); Pedro T. Santos, Houston, TX (US)

(73) Assignee: CNGMOTIVE, INC., Frankfort, IL (US)

( * ) Notice: Subject to any disclaimer, the term of this patent is extended or adjusted under 35 U.S.C. 154(b) by 342 days.

(21) Appl. No.: 16/466,829

(22) PCT Filed: Dec. 1, 2017

(86) PCT No.: PCT/US2017/064212
§ 371 (c)(1),
(2) Date: Jun. 5, 2019

(87) PCT Pub. No.: WO2018/106530
PCT Pub. Date: Jun. 14, 2018

(65) Prior Publication Data
US 2019/0344808 A1  Nov. 14, 2019

Related U.S. Application Data

(60) Provisional application No. 62/430,697, filed on Dec. 6, 2016.

(51) Int. Cl.
*B60L 50/15* (2019.01)
*F02D 29/06* (2006.01)
(Continued)

(52) U.S. Cl.
CPC .............. *F02D 29/06* (2013.01); *B60L 50/15* (2019.02); *B60L 50/60* (2019.02); *B61C 3/02* (2013.01);
(Continued)

(58) Field of Classification Search
CPC ...... B60L 50/60; B60L 50/15; B60L 2200/26; B61C 3/02; B61C 5/00; B61C 17/02;
(Continued)

(56) References Cited

U.S. PATENT DOCUMENTS 8,820,247 B1  9/2014  Claussen et al.
8,958,972 B1  2/2015  Fisher
(Continued)

FOREIGN PATENT DOCUMENTS

EP    2154044 A2     2/2010
WO   2014026696 A1   2/2014
(Continued)

OTHER PUBLICATIONS

"Extended European Search Report", European Patent Application No. EP17877504 (11 pages), dated Jun. 26, 2020.
(Continued)

*Primary Examiner* — Robert J McCarry, Jr.
(74) *Attorney, Agent, or Firm* — Neal, Gerber & Eisenberg LLP

(57) ABSTRACT

A vehicle may include: a genset including: an engine configured to combust light fuel such as natural gas, a generator linked to the engine and configured to convert mechanical energy provided by the engine into electrical energy; one or more light fuel storage containers; one or more electrical storage devices such as batteries; a plurality of wheels; a plurality of electric motors configured to drive the plurality of wheels; a first power bus configured to electrically connect the generator of the genset, the one or more electrical storage devices, and the plurality of electric motors. Each of the one or more electrical storage devices may be disposed lower than each of the one or more light fuel
(Continued)

storage containers with respect to a vertically extending reference axis that is perpendicular to a reference plane parallel to ground.

27 Claims, 9 Drawing Sheets

(51) Int. Cl.
- *B61C 3/02* (2006.01)
- *B61C 5/00* (2006.01)
- *B61C 17/06* (2006.01)
- *B61C 17/12* (2006.01)
- *F02D 19/06* (2006.01)
- *B60L 50/60* (2019.01)
- *B61C 17/02* (2006.01)
- *B61G 5/10* (2006.01)

(52) U.S. Cl.
CPC ............... *B61C 5/00* (2013.01); *B61C 17/06* (2013.01); *B61C 17/12* (2013.01); *F02D 19/0642* (2013.01); *B60L 2200/26* (2013.01); *B61C 17/02* (2013.01); *B61G 5/10* (2013.01)

(58) Field of Classification Search
CPC .............. B61C 17/06; B61C 17/12; B61G 5/10; F02D 29/06; F02D 19/0642
See application file for complete search history.

(56) References Cited

U.S. PATENT DOCUMENTS

| | | |
|---|---|---|
| 2002/0174796 A1 | 11/2002 | Kumar et al. |
| 2008/0223250 A1 | 9/2008 | Bachman |
| 2014/0033738 A1 | 2/2014 | Billig et al. |
| 2014/0033945 A1 | 2/2014 | Foege et al. |
| 2014/0060377 A1 | 3/2014 | Billig et al. |
| 2015/0035278 A1 | 2/2015 | Eisa et al. |
| 2015/0367736 A1* | 12/2015 | Salomonsen ........... B60L 50/60 105/35 |
| 2016/0236694 A1* | 8/2016 | Frazier ..................... B61C 5/00 |

FOREIGN PATENT DOCUMENTS

| | | |
|---|---|---|
| WO | 2014126480 A1 | 8/2014 |
| WO | 2017222803 A1 | 12/2017 |

OTHER PUBLICATIONS

"International Search Report and Written Opinion", PCT/US2017/064212 (21 pages) dated Apr. 4, 2018.

"Examination Report", corresponding Indian Patent Application No. 201917022280, dated Feb. 8, 2022.

* cited by examiner

| Mode Position | Capacity of First Engine 30 | Discharge of Batteries 1014 | Capacity of Genset 1010 |
|---|---|---|---|
| 1 | Responsive to Throttle. | Disabled. | Inactive. |
| 2 | Inactive. | Responsive to Throttle. | Responsive to Throttle. |
| 3 | Inactive. | Responsive to Throttle. | Inactive, Unless Batteries Fall Below Predetermined Charge |
| 4 | Inactive. | Disabled. | Responsive to Throttle. |
| 5 | Responsive to Throttle. | Disabled. | Responsive to Throttle. |
| 6 | Responsive to Throttle. | Responsive to Throttle. | Inactive. |
| 7 | Responsive to Throttle. | Responsive to Throttle. | Responsive to Throttle. |

FIG. 8

| Throttle Position | Control of First Engine 30 | Control of Batteries 1014 | Control of Genset 1010 |
|---|---|---|---|
| 1 | Off. | If Battery Energy > C-1, then Discharge Batteries. If Battery Energy < C-1, then Charge Batteries. | If Battery Energy > C-1, then Genset is Off. If Battery Energy < C-1, then Run Genset at Level G-1. |
| 2 | Off. | If Battery Energy > C-2, then Discharge Batteries. If Battery Energy < C-2, then Charge Batteries. | If Battery Energy > C-2, then Genset is Off. If Battery Energy < C-2, then Run Genset at Level G-2. |
| 3 | Off. | If Battery Energy > C-3, then Discharge Batteries. If Battery Energy < C-3, then Charge Batteries. | If Battery Energy > C-3, then Run Genset at Level G-3. If Battery Energy < C-3, then Run Genset at Level G-4. |
| 4 | Run First Engine at Level E-1 | Charge Batteries if Battery Energy < C-4. | Run Genset at Level G-5. |
| 5 | Run First Engine at Level E-2 | Charge Batteries if Battery Energy < C-4. | Run Genset at Level G-5. |
| 6 | Run First Engine at Level E-3 | Charge Batteries if Battery Energy < C-4. | Run Genset at Level G-5. |

FIG. 9

SYSTEMS AND METHODS FOR VEHICULAR POWER GENERATION

PRIORITY CLAIM

This application is a national stage application of PCT/US2017/064212, filed on Dec. 1, 2017, which claims priority to and the benefit of U.S. Provisional Patent Application No. 62/430,697, filed Dec. 6, 2016, the entire contents of which are incorporated herein by reference.

RELATED APPLICATION

Some features of this application relate to U.S. patent application Ser. No. 15/188,603, filed on Jun. 21, 2016, which is hereby incorporated by reference in its entirety.

TECHNICAL FIELD

This patent application generally relates to power generation for vehicles such as trains, ships, trucks, and mining equipment.

BACKGROUND

A train typically includes one or more locomotives linked to a series of railcars. The one or more locomotives supply motive power to the train, while the railcars carry goods and/or passengers. Two or more locomotives or locomotive-like vehicles coupled together and under simultaneous single control is referred to herein as a consist of locomotives or a consist. Many known locomotives include a heavy fuel engines such as diesel engines for supplying the motive power. More specifically, many locomotives include diesel engines configured to generate motive power by combusting liquid heavy fuel such as diesel fuel.

Diesel combustion releases pollutants into the atmosphere. To reduce pollution, some known locomotives burn natural gas instead of diesel fuel. Combustion of natural gas is cleaner than combustion of diesel, but natural gas locomotives pose a new set of challenges.

First, known natural gas locomotives typically fail to generate enough motive power to haul railcars over long distances because natural gas engines have a relatively lower power generation to volume ratio than diesel engines. Second, known natural gas engines respond more slowly to throttle inputs than diesel engines due to delay in fuel and turbo charged air reaching the natural gas engines. Third, known natural gas engines are more expensive than diesel engines. Fourth, to avoid inflicting internal engine damage, known natural gas engines must operate at a certain minimum capacity (e.g., 50% capacity). Thus, known natural gas locomotives, when supplying a minimal amount of motive power, operate at the certain minimum capacity and shed excess power.

Accordingly, there is a need for new natural gas locomotives or vehicles that solve these problems.

SUMMARY

Various embodiments of the present disclosure solve the above problems by providing a second vehicle configured to couple with a first vehicle. After coupling, the first vehicle may be capable of supplying electrical energy to the second vehicle and the second vehicle is capable of selectively supplying electrical energy to the first vehicle.

In various embodiments of the present disclosure, the first vehicle may include a first engine configured to combust a heavy fuel (such as diesel). The second vehicle may include a second engine or genset configured to combust a clean and light fuel (such as, but not limited to, a natural gas). Light fuels typically have a lower power density than heavy fuels. Thus, upon coupling of the second vehicle with the first vehicle, the first engine of the first vehicle may be active when the second vehicle is incapable of providing sufficient motive power (or doing so would not be desired or effective). Otherwise, the first engine may be off in favor of the genset, thus enabling the first and second vehicles to be powered by the clean light fuel for a significant percentage of operation. When the first engine is active, the second engine may be running at maximum capacity to maximize the amount of power generated by light fuel.

In various embodiments of the present disclosure, the second vehicle may include one or more electrical storage devices such as batteries configured to charge with electrical energy generated by the engine of the first vehicle, electrical energy generated by the genset of the second vehicle, and/or electrical energy generated during braking and recovered by a hybrid energy recovery system. Because the electrical storage devices such as the batteries may discharge while the genset runs, the second vehicle is advantageously capable of producing a total energy output greater than the maximum capacity of the genset. Furthermore, the electrical storage devices such as the batteries enable the second vehicle to perform light duty without shedding excess power generated by the genset.

In various embodiments of the present disclosure, the second vehicle may include a plurality of compartments. One of the compartments may store fuel for the genset and one of the compartments may store the electrical storage devices such as batteries. The fuel storage compartment may be advantageously located above the battery compartment. If light fuel (e.g., natural gas) leaks from fuel storage, the light fuel is often in a gaseous state. Thus, when the fuel storage compartment is located above the battery storage compartment, any gaseous leaking fuel will travel vertically upward and away from the electrical storage devices (such as the batteries), thus reducing the probability of the electrical storage devices (such as the batteries) igniting the leaking fuel. Furthermore, when the electrical storage device leaks, the leak is often in liquid form. Thus, when the electrical storage device compartment is located below the fuel storage compartment, any leaking fluid will travel vertically downward and away from the fuel storage.

In various embodiments of the present disclosure, when the first and second vehicles are coupled together, the first and second vehicles may form a consist. The consist may offer a wide range of advantages. First, the consist may be capable of running at near zero emissions at various times of operation, for example when the first engine is inactive while the genset and/or the electrical storage devices (such as the batteries) power the consist. In addition to improving the environment, near zero emissions may enable a consist operator to realize regulatory savings (such as, but not limited to, carbon credits). Second, the consist may be capable of producing more power than known natural gas locomotives by virtue of the heavy fuel combusting first engine, which may be active when the second engine cannot supply sufficient power to the consist. Third, because the first engine and the genset are capable of distributing power over two sets of motors (i.e., motors of the first and second vehicles), the motors may operate at an enhanced efficiency and with greater tractive effort.

Various additional advantages of the disclosed consist, first vehicle, and second vehicle of the present disclosure will become apparent from the following detailed description.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 8 is a chart of mode position versus control of the first vehicle and control of the second vehicle of one example embodiment of the present disclosure.

FIG. 9 is a chart of throttle position versus control of the first vehicle and control of the second vehicle of one example embodiment of the present disclosure.

DETAILED DESCRIPTION OF EXAMPLE EMBODIMENTS

Figure 1:
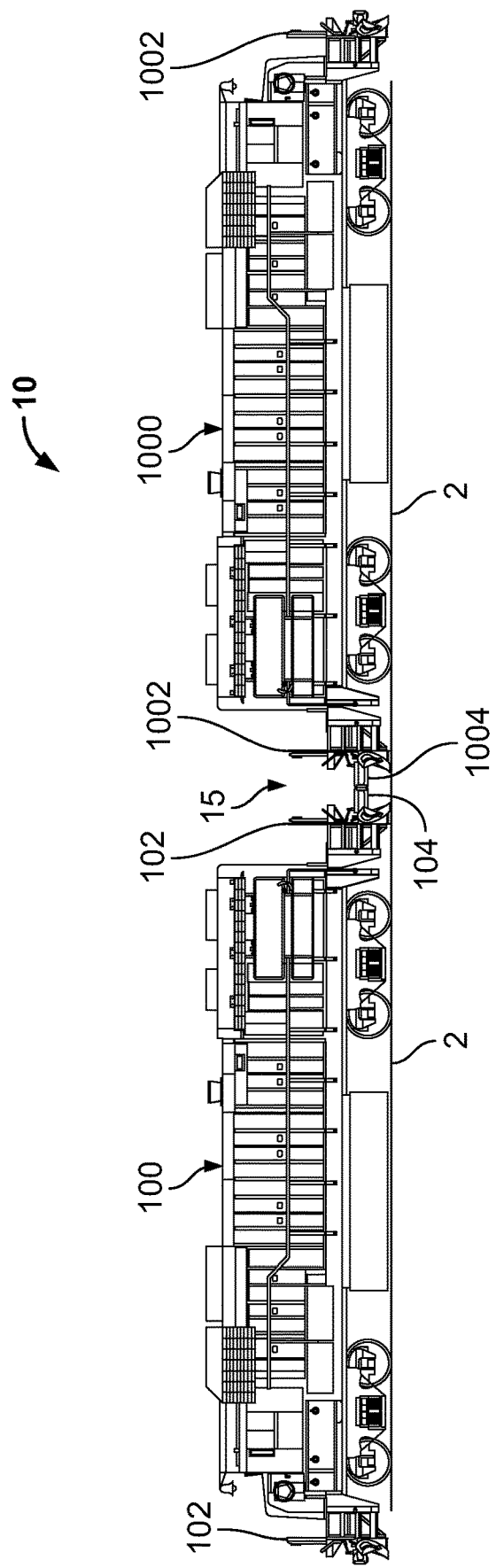
FIG. 1 is a schematic side view of a consist including a first vehicle and a second vehicle of one example embodiment of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated. Any of the disclosed embodiments may be combined into a single embodiment.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

Examples of a Consist Including a First Vehicle and a Second Vehicle

FIG. 1 generally shows and illustrates an exemplary consist 10 of the present disclosure. The consist 10 includes a first vehicle 100 coupled to a second vehicle 1000. The first vehicle 100 may be a traditional diesel powered locomotive including one or more diesel engines. The second vehicle 1000 may be a light fuel powered locomotive such as a natural gas powered locomotive including one or more light fuel engines such as natural gas engines. The second vehicle 1000 may be a slug or auxiliary locomotive. The second vehicle 1000 may or may not include an operator booth for an engineer and/or a throttle control. When the second vehicle 1000 does not include an operator booth for an engineer, the second vehicle 1000 is controlled from a remote location. The remote location may be an operator booth of first vehicle 100. The remote location may be a remote computer in operative communication with the second vehicle 1000. Wheels of the first and second vehicles 100 and 1000 may be tangent with a reference plane 2. The reference plane 2 may parallel to ground. When the consist is resting on ground, the reference plane 2 may be coplanar with (and thus parallel to) ground. When the consist 10 is resting on tracks, the reference plane 2 may be parallel with, but vertically offset from, ground.

The first vehicle 100 may include one or more first couplers 104 and one or more first end plates or snow plows 102. The second vehicle 1000 may include one or more second couplers 1004 and one or more second end plates or snow plows 1002. Although the first vehicle 100 is disposed to the left of the second vehicle 1000 in FIG. 1, such an arrangement is purely exemplary (as with all features disclosed in this patent application). In practice, the locations of the first and second vehicles 100 and 1000 may be swapped. As discussed below, the couplers 104 and 1004 enable: (a) transmission of electronic data between adjacent vehicles or railcars, (b) transmission of electrical energy between adjacent vehicles or railcars, (c) transmission of compressed air between adjacent vehicles or railcars, and (d) mechanical linkage between adjacent vehicles or railcars.

As shown in FIG. 1, one of the first couplers 104 may be attached one of the second couplers 1004 to form a vehicle link 15. The vehicle link 15 may enable electrical communication between the first and second vehicles 100 and 1000. More specifically, the vehicle link 15 may enable the first vehicle 100 to transmit electrical energy and electronic data to the second vehicle 1000 and the second vehicle 1000 to transmit electrical energy and electronic data to the first vehicle 100. The vehicle link 15 may enable the first vehicle 100 to supply compressed air to the second vehicle 1000 and the second vehicle 1000 to supply compressed air to the first vehicle 100. The vehicle link 15 may form a mechanical link between the first and second vehicles 100 and 1000, enabling the leading vehicle (e.g., the first vehicle 100) to pull the trailing vehicle (e.g., the second vehicle 1000).

The train or consist may include a plurality of railcars (not shown) coupled to the first vehicle 100 and/or the second vehicle 1000. Each of the plurality of railcars may include railcar couplers. One or both of the first and second vehicles 100 and 1000 may be in electrical communication with the plurality of railcars via the railcar couplers and one or more of the first and second couplers 104 and 1004. At least one of the first vehicle 100 and the second vehicle 1000 may supply electrical energy and/or compressed air to the plurality of railcars via the railcar couplers.

According to some embodiments, the plurality of railcars (not shown) are disposed between the first vehicle 100 and the second vehicle 1000. According to these embodiments, the first vehicle 100 and the second vehicle 1000 may electrically communicate through the plurality of railcars, and more specifically, through at least one of the first couplers 104, through the plurality of railcar couplers, and through at least one of the second couplers 1004.

Examples of the First Vehicle

Figure 2:
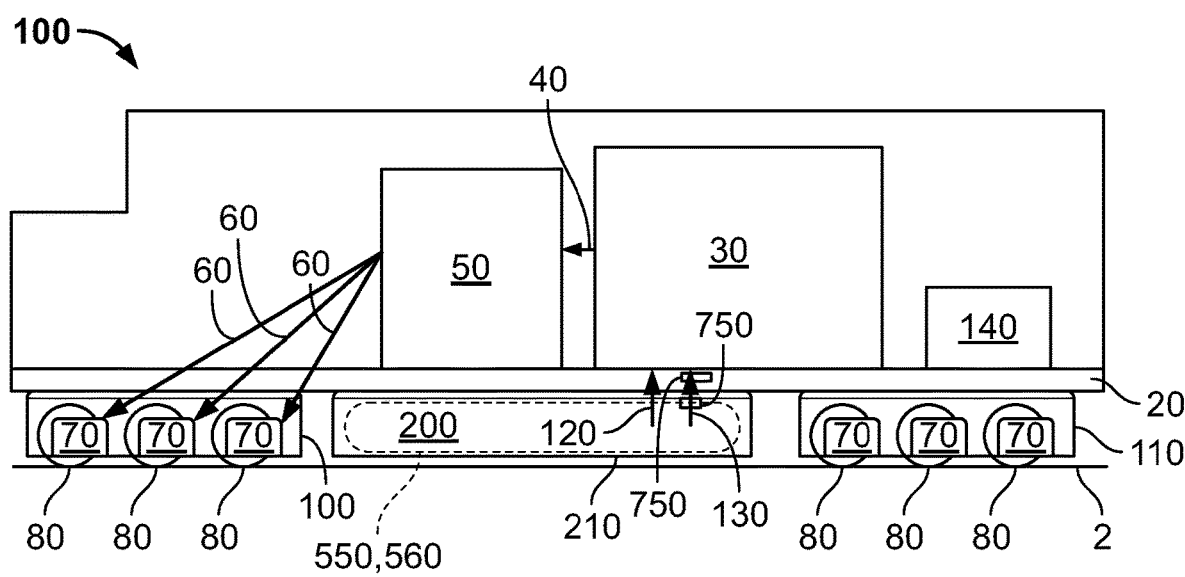
FIG. 2 is block diagram of certain components of the first vehicle of FIG. 1.

Turning to FIG. 2, the first vehicle 100 may include a frame (not labeled), a first engine 30 (e.g., a diesel engine), a drive shaft 40, a first generator 50, a first electrical bus 60, a plurality of first motors 70, a plurality of first axles (not shown), a plurality of first wheels 80, a first fuel tank 200, a first fuel supply line 120, a first air compressor 140, a plurality of compressed air supply lines (not shown), and a first braking system including a plurality of first brakes (not shown). As stated above, the first vehicle 100 may include one or more first couplers 104 and one or more first end plates or snow plows 102. The frame (not labeled) may support at least the first engine 30, the first generator 50, the first fuel tank 200, and the first air compressor 140. The first engine 30 may be at least 1,500, 1,600, 1,700, 1,800, 1900, or 2,000 hp.

The first fuel tank 200 may store diesel fuel and supply the diesel fuel to the first engine 30 via the first fuel supply line 120. The first engine 30 may combust the supplied diesel fuel to rotate the first drive shaft 40. The first generator 50 may convert the rotation of the first drive shaft 40 into electrical energy. The first electrical bus 60 may supply the electrical energy of the first generator 50 to the first motors 70 (although not shown, the first electrical bus is connected to all of the first motors 70) and the first air compressor 140. The first electrical bus 60 may be configured to accept electrical energy from the first generator 50 and from the first couplers 104.

The first motors 70 may drive or rotate the plurality of first axles (not shown). Each first axle may be mechanically linked with two opposing first wheels 80. Thus, rotation of the first axles may cause rotation of the first wheels 80. The first air compressor 140 may compress ambient air and deliver the compressed ambient air, via the compressed air supply lines (not shown) to the first braking system. The first braking system may include bias members (e.g., springs) configured to bias the first brakes into frictional engagement with the first wheels 80. The compressed air may oppose the bias of the bias members, enabling the first brakes to disengage from the plurality of first wheels 80. Alternatively, the first braking system may include bias members (e.g., springs) configured to bias the first brakes to a disengaged position where the first brakes are not in frictional contact with the first wheels. The compressed air, when supplied to the first braking system, may oppose the bias of the bias members, enabling the first brakes to engage the plurality of first wheels 80.

FIG. 2 includes additional features related to a dual-fuel embodiment of the first vehicle 100. These additional features are described below. It should be appreciated that when the first vehicle 100 is configured to run on a single fuel source (e.g., diesel), the additional features related to the dual-fuel embodiment of the first vehicle 100 (e.g., the second fuel line 130, the vessels 550 and 560) may be absent. Although FIG. 2 shows a six axle first vehicle and FIG. 2 shows a four axle second vehicle, both the first and second vehicle may have different numbers of axles than shown, and may have either the same number of axles as each other or a different number of axles.

Examples of the Second Vehicle

Figure 3:
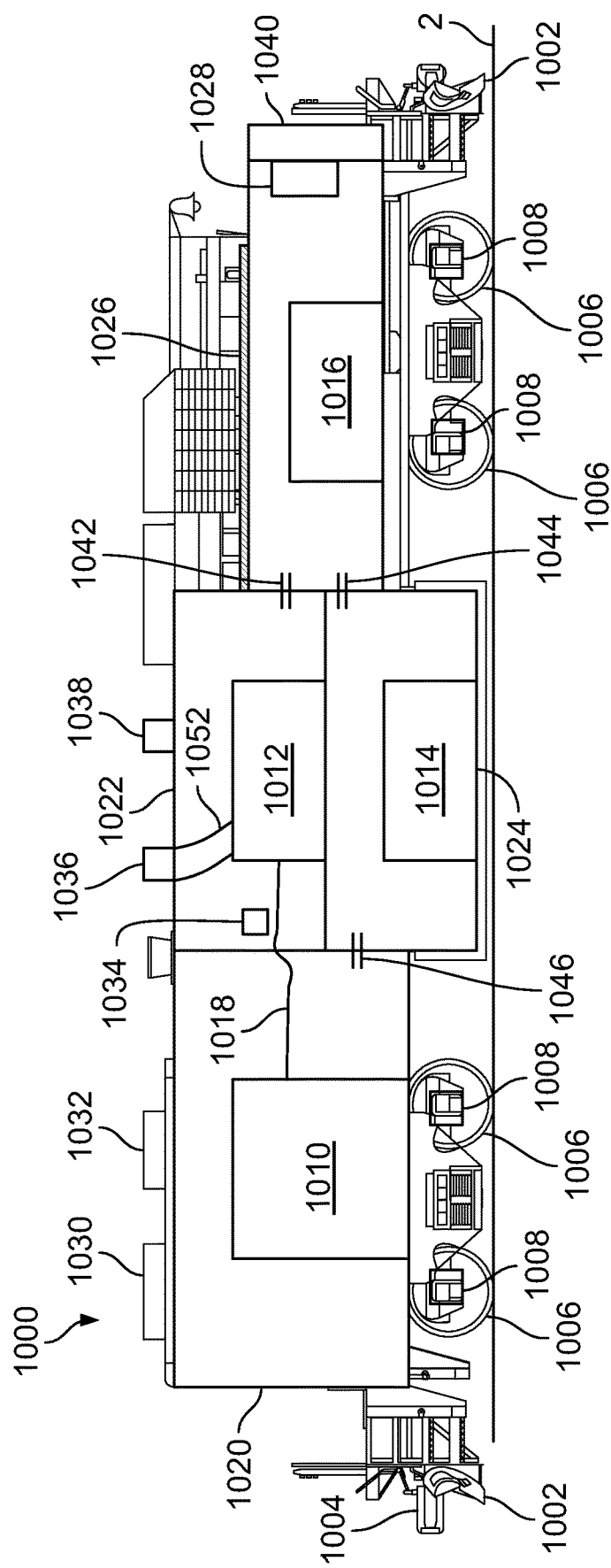
FIG. 3 is a block diagram of certain components of the second vehicle of FIG. 1.

Turning to FIG. 3, the second vehicle 1000 may be configured to generate and/or supply electrical energy by (a) combusting clean energy such as a light fuel (such as natural gas) with a genset 1010 and (b) drawing energy from one or more electrical sources or storage devices such as batteries 1014. The second vehicle 1000 may include a frame (not labeled), a genset compartment 1020 housing the genset 1010, a light fuel compartment such as natural gas (NG) compartment 1022 housing one or more NG cylinders 1012, one or more NG lines 2160, a battery compartment 1024 housing the one or more batteries 1014, an air compressor compartment 1026 housing a second air compressor 1016, a plurality of second motors 1008, a plurality of second wheels 1006, a plurality of second axles (not shown), a second braking system including a plurality of second brakes (not shown), a second electrical bus 1050, and a hybrid energy recovery system 1048. The frame may support at least the genset 1010, the NG cylinders 1012, the batteries 1014, and the second air compressor 1016.

As explained below, although the genset 1010 and the cylinders 1012 are discussed as respectively combusting and storing NG, the genset 1010 and the cylinders 1012 may respectively combust and store any suitable fuel having a low emission profile (i.e., a clean fuel). According to some embodiments, and as discussed below, the genset 1010 may combust and the cylinders 1012 may store compressed natural gas (NG). According to some embodiments, and as discussed below, the genset 1010 may combust and the cylinders 1012 may store liquefied natural gas (LNG), propane, etc.

While typically gensets provide 800 hp at maximum capacity, the disclosed genset 1010 may be configured to provide 100, 200, 300, 400, 500, 600, or 700 hp at maximum capacity. Thus, the disclosed genset 1010 may be substantially less expensive than typical gensets. The disclosed genset 1010 may have lower capacity than typical gensets because the first vehicle 100 is capable of providing supplemental power to the consist 10.

The second vehicle 1000 may include a plurality of vents. The plurality of vents may include a first vent 1030 configured to fluidly communicate the genset compartment 1020 with ambient atmosphere, a second vent 1032 configured to exhaust combustion products produced by the genset 1010 into ambient atmosphere, a third vent 1034 configured to fluidly communicate the NG compartment 1022 with ambient atmosphere, a fourth vent 1036 configured to fluidly communicate the NG cylinders 1012 with ambient atmosphere, a fifth vent 1038 configured to fluidly communicate the NG compartment 1022 with ambient atmosphere, a sixth vent 1040 configured to fluidly communicate the air compressor compartment 1026 with ambient atmosphere, and a fan 1028 configured to draw in ambient air through the fifth vent 1040.

The second vehicle 1000 may include a plurality of ducts in certain embodiments of the present disclosure. In such embodiments, the plurality of ducts may include a first duct 1042 configured to fluidly communicate the NG compartment 1022 with the air compressor compartment 1026, a second duct 1044 configured to fluidly communicate the battery compartment 1024 with the air compressor compartment 1026, and a third duct 1046 configured to fluidly communicate the genset compartment 1020 with the battery compartment 1024. As described below, each of the vents and the ducts may be selectively opened or closed. Similarly, the fan 1028 may be selectively powered.

The genset compartment 1020 may enclose the genset 1010. In the illustrated example embodiments, the genset 1010 includes an engine (also called a second engine) and an electric generator (also called a second generator). More specifically, the genset 1010 may be configured to (a) combust NG to rotate a second drive shaft (not shown) and (b) convert rotation of drive shaft into electrical energy. The genset 1010 may supply electrical energy into the second electrical bus 1050.

The NG compartment 1022 may enclose one or more light fuel cylinders such as natural gas cylinders 1012 that deliver NG to the genset 1010 via one or more NG lines 2160. The battery compartment 1024 may enclose the one or more batteries 1014. The batteries 1014 may be configured to charge by accepting electrical energy from the second electrical bus 1050 and to discharge by supplying electrical energy into the second electrical bus 1050.

The air compressor compartment 1026 may enclose the second air compressor 1016. The second air compressor 1016 may be linked, via second brake lines (not shown), to the second braking system. The second air compressor 1016, the second brake lines, and the second braking system may operate similar to the first air compressor 140, the first brake lines, and the first braking system.

The compartments 1020, 1022, 1024, and 1026 may be defined by relatively thick walls. The thick walls may be mounted on the frame of the second vehicle 1000. The walls may be steel. In various embodiments, the walls may have extra suitable reinforcements for penetration resistance and/or a suitable crash crunch zone to absorb energy.

The battery compartment 1024 may be located at least partially below the other compartments (with respect to ground) to (a) lower the center of gravity of the second vehicle 1000 through the batteries 1014 and (b) direct any fluid leaking from the batteries 1014 to a bottom of the second vehicle 1000, where the battery fluid is unlikely to enter other compartments. Since battery fluid is often corrosive, any leaking battery fluid may damage components of the second vehicle 1000.

If the battery fluid were located above the NG compartment 1022, leaking battery fluid could corrode through the walls separating the NG compartment from the battery compartment 1024, and reach the NG cylinders 1012. Upon reaching the NG cylinders, the leaking battery fluid could corrode through the NG cylinders, thus generating a NG leak. Since leaked NG is often in a gaseous state, the leaked NG could permeate through the second vehicle 1000 until reaching the batteries, the second air compressor, or the genset. Because these components may include unprotected electrical connections, any one of these components could ignite the leaked NG, potentially causing an explosion or a fire. By placing the battery compartment below the NG compartment, the second vehicle 1000 may substantially reduce a risk of any such explosion or fire.

The NG compartment 1022 and/or the NG cylinders 1012 may be located at least partially above the battery compartment 1024, the genset compartment, and/or the air compressor compartment to reduce the possibility that any NG leaking from the NG cylinders 1012 reaches the batteries, the genset, or the air compressor. More specifically, NG leaking from NG cylinders is often in a gaseous state. Therefore, NG leaking from NG cylinders often vertically rises. If the NG cylinders were located below the batteries, the genset, or the second air compressor, any leaking NG could reach unprotected electrical connections of these components, thus resulting in an explosion or fire. By placing the NG compartment above the genset compartment, the battery compartment, and the air compressor compartment, the second vehicle 1000 may substantially reduce a risk of explosion or fire.

The batteries 1014 may be located closer to the second wheels 1006 and the second motors 1008 than the NG cylinders 1012. The battery compartment 1024 may be located closer to the second wheels 1006 and the second motors 1008 than the NG compartment 1022. The NG compartment 1022 may be located at least partially above the genset compartment. The NG cylinders 1012 may be located above a bottom surface of the genset 1010.

The second motors 1008, the second axles, and the second wheels 1006 may operate similar to the first motors, 70, the first axles, and the first wheels 80. More specifically, the second electrical bus 1050 may deliver electrical energy supplied from (a) the genset 1010, (b) the batteries 1014, and/or (c) the second couplers 1004 to the second motors 1008. The second motors 1008 may drive the second axles, which may rotate or drive the second wheels 1006.

According to some embodiments, the second vehicle 1000 may include a hybrid energy recovery system 1048 configured to recover energy lost during braking and transmit the recovered braking energy to the batteries 1014. The hybrid energy recovery system 1048 may include one or more ultracapacitors (not shown) and/or one or more batteries (not shown). In various such embodiments, one or more of the batteries may be a high power low energy battery.

The hybrid energy recovery system 1048 may be configured to convert braking energy of the second wheels 1006 into electrical energy and to supply the electrical energy into the second electrical bus 1050. The second electrical bus 1050 may direct the electrical energy supplied by the hybrid energy recovery system 1048 into the batteries 1014. According to some embodiments, the hybrid energy recovery system 1048 may be located electrically upstream of and in series with the batteries 1014.

With reference to FIG. 3, the NG compartment 1022 may receive ambient air from the third vent 1034 and the first duct 1042 and expel the ambient air through first the fifth vent 1038. The third and fifth vents 1034 and 1038 may enable ambient air to cool the NG cylinders 1012. The third and fifth vents 1034 and 1038 may enable ambient air to mix with and dilute natural gas leaking from the NG cylinders 1012. A top surface (i.e., ceiling) of the NG compartment 1022 may include an apex or highest vertical point. The fifth vent 1038 may be located at the apex of the top surface to discourage leaked NG from being trapped inside the NG compartment 1022.

According to some embodiments, the NG compartment 1022 may be configured to fluidly isolate ambient air from the other compartments 1020, 1024, and 1026. According to some embodiments, the NG compartment 1022 may be configured to selectively fluidly communicate with the air compressor compartment 1026 via the first duct 1042. The first duct 1042 may enable air drawn through the sixth vent 1040 by the fan 1028 to enter NG compartment 1022 to: (a) cool the NG cylinders 1012, and (b) dilute natural gas leaking from the NG cylinders 1012.

The NG cylinders 1012 may be configured to fluidly link, via a NG venting line 1052, to the fourth vent 1036. When pressure in the NG cylinders 1012 exceeds a preset pressure, a pressure relief valve may open, placing the NG cylinders 1012 in fluid communication with the NG venting line 1052. NG may vent from the NG cylinders 1012 through the NG venting line 1052 and the fourth vent 1036 into ambient atmosphere. Such venting may reduce the pressure of the NG cylinders 1012 below the preset pressure.

The genset compartment 1020 may be configured to selectively accept air from the battery compartment 1024 via the third duct 1046 and the battery compartment 1024 may be configured to selectively accept air from the air compressor compartment 1026 via the second duct 1044. The genset compartment 1020 may expel ambient air through first vent 1030. The air compressor compartment 1026 may receive ambient air via the sixth vent 1040 and the fan 1028. Ambient air flowing through the second vehicle 1000 may cool the second air compressor 1016, the batteries 1014, and the genset 1010. The ambient air may dilute natural gas present in the genset compartment 1020. The genset may exhaust combusted natural gas products through the second vent 1032.

The NG cylinders 1012 may include two opposing ends. The NG venting line 1052 may connect to the NG cylinders 1012 via at least one joint. The NG venting line 1052 may connect to the fourth vent 1036 via at least one joint. The NG delivery line 1018 may connect to the NG cylinders 1012 via at least one joint. During manufacturing, some or all of: (a) the two opposing longitudinal ends of the NG cylinders 1012, (b) the joints of the NG venting line 1052, (c) the joints of the NG delivery line 1018, and (d) the outlet of the fourth vent 1036 may be placed at least a predetermined distance (e.g., 15 feet or about 4.57 meters) from the nearest unprotected electrical connection and/or from the nearest ignition source. As explained below with reference to FIG. 5, the predetermined distance may be measured as the shortest unobstructed fluid flow distance.

Figure 5:
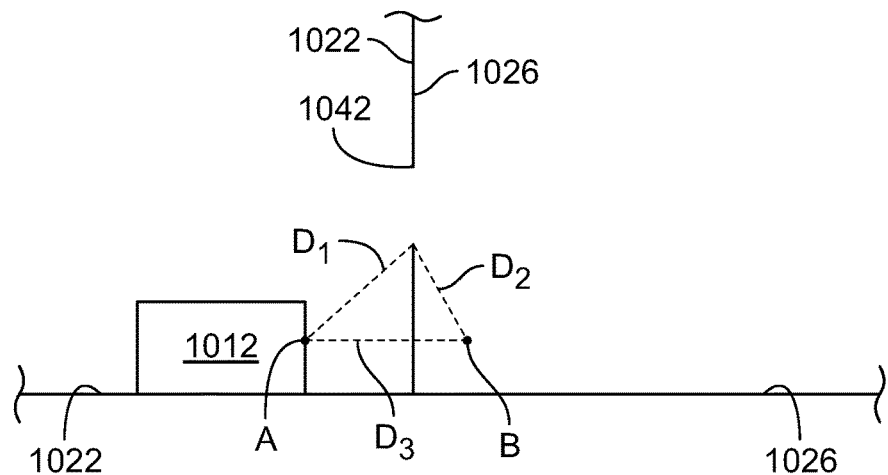
FIG. 5 is a schematic view of a portion of the second vehicle of FIG. 1 illustrating a shortest unobstructed distance between an unprotected electrical connection and a longitudinal end of a natural gas tank.

FIG. 5 is a partial view of the NG compartment 1022 housing the NG cylinders 1012, the air compressor compartment 1026, and the first duct 1042, which may fluidly connect the NG compartment 1022 with the air compressor compartment 1026. A first longitudinal end A of the NG cylinders 1012 is a distance $D_3$ from an unprotected electrical connection B. By virtue of the walls defining the compartments 1022 and 1026, the shortest unobstructed distance from the first longitudinal end A to the unprotected electrical connection B is the sum of distance $D_1$ and $D_2$. While distance $D_3$ may be less than or equal to the predetermined distance (e.g., 15 feet or about 4.57 meters), the sum of distances $D_1$ and $D_2$ may be greater than the predetermined distance. The shortest unobstructed distance between the first longitudinal end A and the unprotected electrical connection B is the sum of distances $D_1$ and $D_2$, as opposed to distance $D_3$, because walls defining the compartments 1022 and 1026 prevent fluid from flowing from A to B along distance $D_3$.

Examples of the First and Second Electrical Buses

Figure 4:
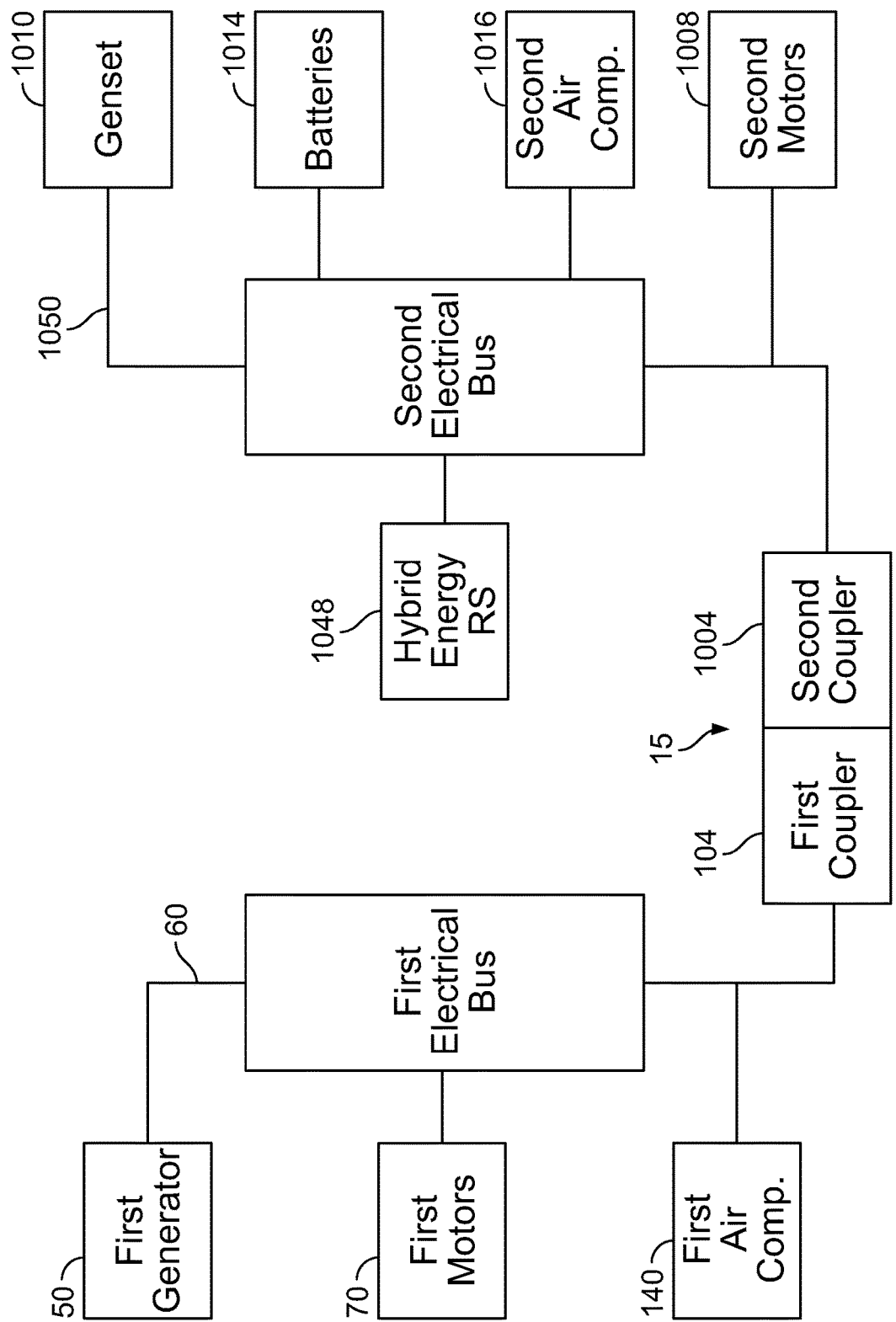
FIG. 4 is a block diagram of a first electrical bus of the first vehicle of FIG. 1 coupled to a second electrical bus of the second vehicle of FIG. 1.

FIG. 4 is a diagrammatic view of the first electrical bus 60 coupled to the second electrical bus 1050. The first electrical bus 60 may be in electrical communication with the first generator 50, the first motors 70, the first air compressor 140, and the second electrical bus 1050. The second electrical bus 1050 may be in electrical communication with the genset 1010, the batteries 1014, the second air compressor 1016, the second motors 1008, the hybrid energy recovery system 1048, and the first electrical bus 60. The first electrical bus 60 may be in electrical communication with the second electrical bus 1050 via the vehicle link 15 formed between one of the first couplers 104 and one of the second couplers 1004.

As a result of the vehicle link 15, components of the second vehicle 1000 (e.g., the genset 1010, the batteries 1014) may be capable of and configured to supply electrical energy to components of the first vehicle 100 (e.g., the first air compressor 140, the first motors 70). Similarly, components of the first vehicle 100 (e.g., the first generator 50) may be capable of and configured to supply electrical energy to components of the second vehicle 1000 (e.g., the second air compressor 1016, the batteries 1014, the second motors 1008). As a result, the first vehicle 100 and the second vehicle 1000 may be each configured to simultaneously power both of the first motors 70 and the second motors 1008. Thus, when one of the vehicles is inactive (e.g., the first engine is off or idling), the other of the vehicles (e.g., the second vehicle) is able to distribute motive power through a greater quantity of motors (e.g., the first motors in addition to the second motors). Because motors typically run most efficiently at lower rates, distributing motive power over a greater quantity of motors improves consist efficiency and tractive effort.

It should be appreciated that the electrical buses 60, 1050 may be connected to and configured to power additional components. For example, the second electrical bus 1050 may be configured to power motors attached to each of the vents, the ducts, and the fan of the second vehicle 1000. It should further be appreciated that the electrical buses 60, 1050 may include a plurality of electrical switches configured to selectively isolate any of the above-described components from the electrical buses 60, 1050. For example, each of the generator 50, the first motors 70, the first air compressor 140, and the first couplers 104 may include a respective electrical switch configured to selectively break electrical communication with the first electrical bus 60. Similarly, each of the genset 1010, the batteries 1014, the second air compressor 1016, the hybrid energy recovery system 1048, the second motors 1008, and the second couplers 1004 may include a respective electrical switch configured to selectively break electrical communication with the second electrical bus 1050.

Examples of the First and Second Computing Systems

Figure 6:
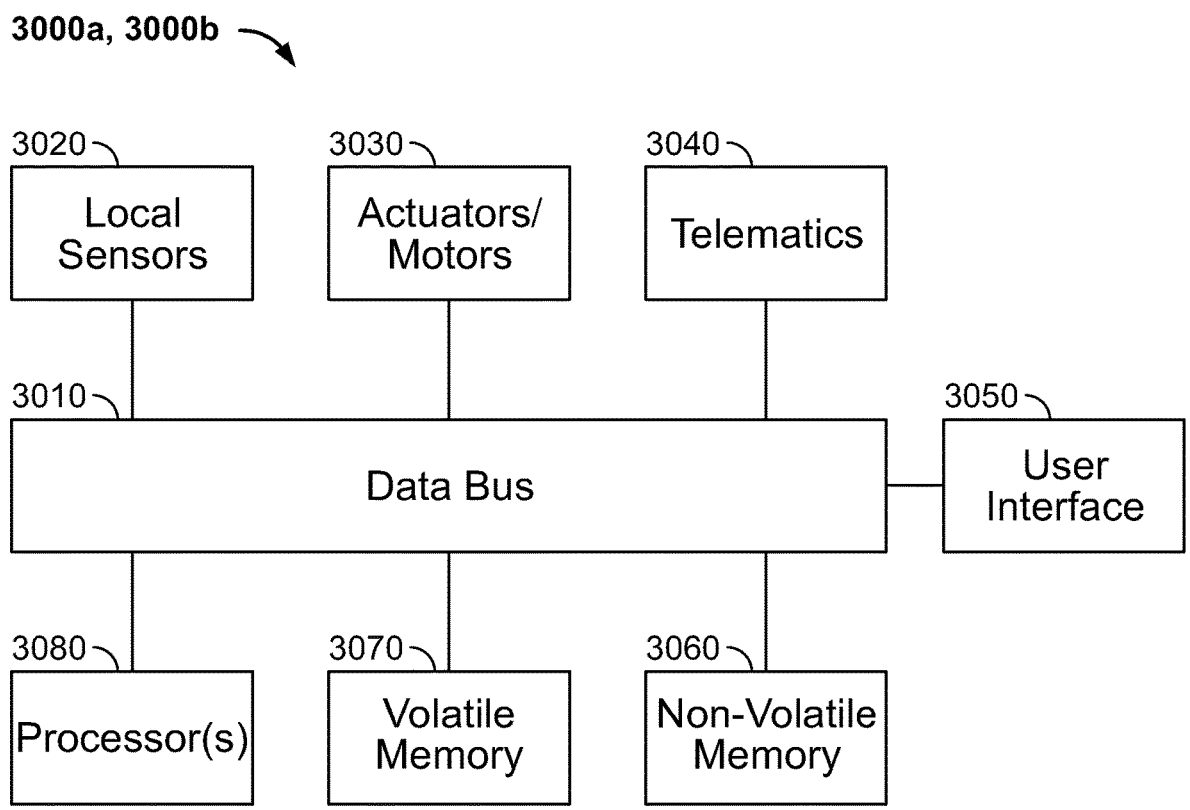
FIG. 6 is a block diagram of a computing system for the first vehicle of FIG. 1 and/or the second vehicle of FIG. 1.

FIG. 6 is a block diagram of first and second computing systems 3000a and 3000b. The first vehicle 100 may include the first computing system 3000a. The second vehicle 1000 may include the second computing system 3000b. The computing systems 3000a and 3000b, and more specifically, the telematics 3040 of the computing systems 3000a, 3000b may communicate via (a) communication wires (e.g., Ethernet cables) extending through one of the first couplers 104 and one of the second couplers 1004 and/or (b) wireless communication technology (e.g., WiFi, Bluetooth, cellular communication such as 3G, 4G, 5G, LTE, etc.).

Each of the computing systems 3000a and 3000b may include a data bus 3010, one or more processors 3080, volatile memory 3070, non-volatile memory 3060, user interfaces 3050, telematics 3040, actuators and motors 3030, and local sensors 3020.

The data bus 3010 may traffic electronic signals or data inside the computing systems 3000a and 3000b. The processors 3080 may perform operations on the electronic signals or data to produce modified electronic signals or data. The volatile memory 3070 may store data for expedited recall by the processors 3080. The non-volatile memory 3060 may store data for recall to the volatile memory 3070 and/or the processors 3080. The non-volatile memory 3060 may include a range of non-volatile memories including hard drives, SSDs, DVDs, Blu-Rays, etc. The user interface 3050 may include displays, touch-screen displays, keyboards, buttons, a throttle, a mode selector, and other devices that enable user interaction with the computing system. According to some embodiments, and as discussed below, the throttle and the mode selector may be virtual and electronically displayed. According to some embodiments, and as discussed below, only one of the first vehicle 100 and the second vehicle 1000 includes a throttle and/or a mode selector.

The telematics 3040 may enable both wired and wireless communication with external processors via any suitable communication technology such as Bluetooth, cellular data (e.g., 3G, LTE), USB, Ethernet, etc. The actuators/motors 3030 may be configured to produce tangible results. Examples of components including actuators/motors include fuel injectors, windshield wipers, engines, motors, electronically controlled valves, fuel pumps, air compressors, louvers that close any of the vents or the ducts, fans, etc. The local sensors 3020 may transmit digital or analog measurements to the processors 3080 or the memory 3070, 3060. Examples of suitable sensors include temperature sensors, rotation sensors, pressure sensors, cameras, lidar (also known as light imaging, detection, and ranging) sensors, radar sensors, etc. It should be appreciated that some or all of the electronic components may include separate or dedicated processors and memory.

It should be appreciated that the vehicles 100 and 1000 may be configured to perform the methods and operations described in this application. In some cases, the vehicles 100 and 1000 may be configured to perform these functions via computer software stored on the memory 3070 and 3060 of the computing systems 3000a, and 3000b. One or more processors are "configured to" perform a disclosed operation at least when at least one of the one or more processors is in operative communication with memory storing a software program with code or instructions embodying the disclosed operation. It should be appreciated that the one or more processors that are configured to perform the disclosed methods and operations may be disposed in the first vehicle 100, the second vehicle 1000, or both of the vehicles 100, 1000.

Examples of Ventilation Control

Some or all of the above-described vents, ducts and fan may be electronically controlled via the second computing system 3000b. The vents and ducts may include louvers configured to open and close. The fan may include an electronically controlled variable speed motor. According to some embodiments, the second vehicle 1000 may include pressure sensors (not shown). The pressure sensors may include one or more first pressure sensors configured to sense pressure of ambient air in the genset compartment 1020, one or more second pressure sensors configured to sense pressure of ambient air in the NG compartment 1022, one or more third pressure sensors configured to sense pressure of ambient air in the battery compartment 1024, and one or more fourth pressure sensors configured to sense pressure of ambient air in the air compressor compartment 1026.

The second computing system 3000b may apply readings from the pressure sensors to sense a backdraft of ambient air from the NG compartment 1022 to the air compressor compartment 1026 or from the battery compartment 1024 to the air compressor compartment 1026. A backdraft from the NG compartment 1022 to the air compressor compartment 1026 may occur when pressure in the NG compartment 1022 exceeds pressure in the air compressor compartment 1026. A backdraft from the battery compartment 1024 to the air compressor compartment 1026 may occur when pressure in the battery compartment 1024 exceeds pressure in the air compressor compartment 1026.

When the second computing system 3000b detects a backdraft from the NG compartment 1022 to the air compressor compartment 1026, the computing system 3000b may automatically close the louvers of the first duct 1042 to isolate the NG compartment 1022 from the air compressor compartment 1026. When the second computing system 3000b detects a backdraft from the battery compartment 1024 to the air compressor compartment 1026, the computing system 3000b may automatically close the louvers of the second duct 1044 to isolate the battery compartment 1024 from the air compressor compartment 1026. Before isolating the battery compartment 1024 from the air compressor compartment 1026, the second computing system 3000b may confirm whether the first duct 1042 is open. If the first duct 1042 is closed, the second computing system 3000b may decline to close the second duct 1044. If the first duct 1042 is open, the second computing system 3000b may automatically close the second duct 1044.

Examples of Mode and Throttle Control

The first vehicle 100 and/or the second vehicle 1000 may include a throttle 4000. The throttle may be a physical switch. The throttle 4000 may be electronically displayed (i.e., virtual). The first vehicle 100 and/or the second vehicle 1000 may include a mode selector 4200. The mode selector may be a physical switch (e.g., a button). The mode selector may be electronically displayed (i.e., virtual).

Figure 7:
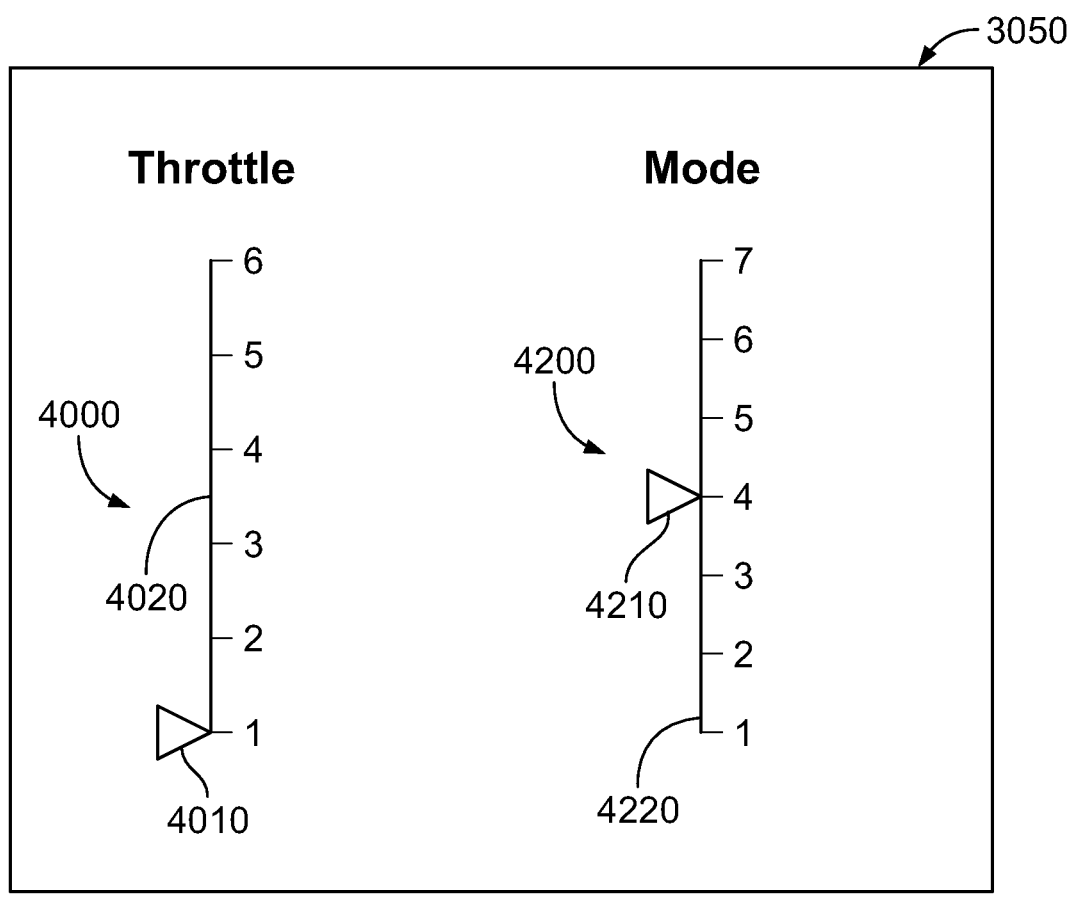
FIG. 7 illustrates a user interface displaying a throttle and a mode selector of one example embodiment of the present disclosure.

FIG. 7 shows a user interface 3050 (e.g., a touchscreen display) of the first vehicle 100. The user interface 3050 may display the throttle 4000 and the mode selector 4200. In this embodiment, the throttle 4000 and the mode selector 4200 are virtual.

The throttle 4000 includes an adjustable throttle arrow 4010 and a static throttle menu 4020 including a plurality of throttle levels 1 to 6. To adjust the throttle 4000, the user slides the adjustable throttle arrow 4010 with respect to the static throttle menu 4020 until the adjustable throttle arrow 4010 reaches a new throttle level.

Similarly, the mode selector 4200 includes an adjustable mode arrow 4210 and a static mode menu 4220 including a plurality of modes 1 to 7. To adjust the mode selector 4200, the user slides the adjustable mode arrow 4210 with respect to the static mode menu 4220 until the adjustable mode arrow 4210 reaches a new mode.

According to some embodiments, the first vehicle 100 and the second vehicle 1000 are configured to be controlled based on a single throttle and a single mode selector. The single throttle and the single mode selector may be located in the first vehicle 100 or the second vehicle 1000. The single throttle and the single mode selector may be remote from both of the first vehicle 100 and the second vehicle 1000 and positions of the single throttle and the single mode selector may be wirelessly transmitted to the consist 10.

The first vehicle 100 and the second vehicle 1000 may be configured to apply some or all of the modes discussed below. As with all features disclosed in this application, the modes discussed below are purely exemplary and in practice, the first vehicle 100 and the second vehicle 1000 may be controlled with any suitable algorithm. It should be appreciated that level, operating level, and capacity are used synonymously in this patent application.

As generally shown in FIG. 8, a first selectable mode may configure first vehicle 100 and/or second vehicle 1000 such that motive power is exclusively provided by the first vehicle 100 (i.e., the genset 1010 and the batteries 1014 are off or at least do not supply energy to the first or second motors 70 and 1008). Thus, when a user adjusts the throttle in the first selectable mode, an operating level of the first engine 30, but not an operating level of the genset 1010 or the batteries 1014, may be changed. The first mode may be advantageous when the second vehicle 1000 is absent, out of fuel, or otherwise inoperable.

As generally shown in FIG. 8, a second selectable mode may configure the first vehicle 100 and/or second vehicle 1000 such that motive power is exclusively provided by the second vehicle 1000 (i.e., the first engine 30 is off, idling, and/or not supplying energy to the first or second motors 70 and 1008). Thus, when a user adjusts the throttle in the second selectable mode, an operating level of the genset 1010 and/or the batteries 1014, but not an operating level of the first engine 30, may be changed. In the second selectable mode, motive power to the first and second motors 70, 1008 may be exclusively supplied by the batteries 1014 until a charge level of the batteries 1014 falls below a predetermined charge level. At this time, the genset 1010 may be run at a level corresponding to a throttle position. The batteries may begin to charge when the consist 10 achieves a magnitude of acceleration below a predetermined threshold acceleration for at least a predetermined amount of time (i.e., achieves a steady state of speed or a speed steady state). The second mode may be advantageous when the first vehicle 100 is absent, out of fuel, or otherwise inoperable. The second mode may be advantageous when the consist 10 is located in an environmentally sensitive area that restricts burning of heavy fuels (e.g., diesel).

As generally shown in FIG. 8, a third selectable mode may enable the first vehicle 100 and/or second vehicle 1000 to provide motive power exclusively supplied by the batteries 1014 of the second vehicle 1000 (unless, according to some embodiments, a charge level of the batteries 1014 falls below a predetermined charge level, as discussed below). Thus, when a user adjusts the throttle in the third selectable mode, an operating level the batteries 1014, but not the first engine 30, or the genset 1010 may be changed. According to some embodiments, when the batteries 1014 fall below a predetermined charge level during the third selectable mode, the genset 1010 may run at a predetermined capacity (e.g., 100% capacity) until the charge level of the batteries 1014 exceeds a predetermined charge level. During this time, the genset 1010 and/or the batteries 1014 may supply motive power to the first and second motors 70, 1008. The third mode may be advantageous when the consist 10 or the second vehicle 1000 is only required for light duty over a short period of time. The third mode advantageously produces little or no emissions from the first engine 30 or the genset 1010.

As generally shown in FIG. 8, a fourth selectable mode may configure first vehicle 100 and/or second vehicle 1000 such that motive power to the first and second motors 70 and 1008 is exclusively supplied by the genset 1010 of the second vehicle 1000. Thus, when a user adjusts the throttle in the fourth selectable mode, an operating level the genset 1010, but not an operating level of the first engine 30, or the batteries 1014 may be changed. The fourth mode may be advantageous when the first vehicle 1000 is absent, out of fuel, or otherwise inoperable. The fourth mode may be advantageous when the consist 10 and/or the second vehicle 1000 are required for light duty for a long period of time.

As generally shown in FIG. 8, a fifth selectable mode may configure first vehicle 100 and/or second vehicle 1000 such that motive power to the first and second motors 70 and 1008 is exclusively supplied by the genset 1010 and/or the first engine 30. Thus, when a user adjusts the throttle in the fifth selectable mode, an operating level of the genset 1010 and/or the first engine 30, but not an operating level of the batteries 1014 may be changed. According to some embodiments, the batteries 1014 may charge, but not discharge, during the fifth selectable mode. According to some embodiments, the batteries 1014 begin to charge once the consist 10 reaches an approximate steady state of speed. The fifth mode may be advantageous when the batteries are absent or otherwise inoperable and/or the consist 10 is required for light or heavy duty over a long period of time.

In the fifth selectable mode, a first plurality of throttle positions may correspond to the genset 1010, but not the first engine 30, supplying motive energy to the first and second motors 70 and 1008. Each of the first plurality of throttle positions may correspond to a different running level of the genset 1010 (e.g., the genset 1010 runs at a first low capacity (e.g., 50% capacity) at one of the first plurality of throttle positions, a second medium capacity (e.g., 75% capacity) at another of the first plurality of throttle positions, and a third high or maximum capacity (e.g., 100% capacity) at another of the first plurality of throttle positions). Thus, in the first plurality of throttle positions, the first engine 30 may be off or idling. The operating level of the first engine 30 may not change as the user adjusts between the plurality of throttle positions, such that each of the plurality of first operating positions correspond to a same running level (e.g., idling or off) of the first engine 30.

In the fifth selectable mode, a plurality of second throttle positions may correspond to the first engine 30 idling while the genset 1010 exclusively supplies motive power the first and second motors 70, 1008. The genset may run at 100% capacity during the plurality of second throttle positions.

In the fifth selectable mode, a plurality of third throttle positions may correspond to the genset 1010 running at a constant level (e.g., 100% capacity) and various running levels of the first engine 30. The third throttle positions may cause both of the first engine 30 and the genset 1010 to supply motive power to the first and second motors 70, 1008.

For example, at one of the plurality of third throttle positions, the genset 1010 may run at the constant level (e.g., 100% capacity), while the first engine 30 runs at a low capacity (e.g., 30%). At another of the plurality of third throttle positions, the genset 1010 may run at the constant level (e.g., 100% capacity), while the first engine 30 runs at a medium capacity (e.g., 50%). At another of the plurality of third throttle positions, the genset 1010 may run at the constant level (e.g., 100% capacity), while the first engine 30 runs at a medium-high capacity (e.g., 75%). At another of the plurality of third throttle positions, the genset 1010 may run at the constant level (e.g., 100% capacity), while the first engine 30 runs at a high capacity (e.g., 90%). At another of the plurality of third throttle positions, the genset 1010 may run at the constant level (e.g., 100% capacity), while the first engine 30 runs at a maximum capacity (e.g., 100%).

The fifth selectable mode may prefer running the genset 1010 to the first engine 30, such that the genset 1010 runs at maximum capacity before the first engine 30 begins to supply motive power to the motors 70, 1008.

As generally shown in FIG. 8, a sixth selectable mode may configure first vehicle 100 and/or second vehicle 1000 such that motive power to the motors 70 and 1008 is exclusively supplied by the batteries 1014 and/or the first engine 30. Thus, when a user adjusts the throttle in the fifth selectable mode, an operating level of the batteries 1014 and/or the first engine 30, but not an operating level of the genset 1010, may be changed. The sixth mode may be advantageous when the genset 1010 is absent or otherwise inoperative.

As generally shown in FIG. 8, a seventh selectable mode may configure the first vehicle 100 and/or second vehicle 1000 such that motive power to the first and second motors 70 and 1008 is supplied by a combination of the first engine 30, the genset 1010, and the batteries 1014. FIG. 9 shows example throttle positions of the seventh selectable mode. As with all features disclosed in the present application, the throttle positions of FIG. 9 are purely exemplary and that a range of other control methods may be applied to the first vehicle 100 and the second vehicle 1000. The seventh mode may be advantageous when user expects the consist 10 to perform light and heavy duties over a long period of time.

With reference to FIG. 9, the seventh selectable mode may include a first group of throttle positions (e.g., throttle positions 1 and 2), a second group of throttle positions (e.g., throttle position 3), and a third group of throttle positions (e.g., throttle positions 4, 5, and 6).

In throttle position 1, the first engine 30 is off or idling. Motive power to the motors 70, 1008 may be thus supplied by the batteries 1014 and/or the genset 1010. If the batteries 1014 have a charge level above a predetermined charge level C-1, then the batteries 1014 may supply motive power to the motors 70 and 1008 and the genset 1010 may be off or idling. If the batteries 1014 have a charge level at or below the predetermined charge level C-1, the genset may be run at a first capacity G-1. The batteries 1014 may begin to charge immediately or the batteries 1014 may wait until the consist 10 attains an approximately steady state speed before charging.

In throttle position 2, the first engine 30 may be off or idling. Motive power to the motors 70 and 1008 may be thus supplied by the batteries 1014 and/or the genset 1010. If the batteries 1014 have a charge level above a predetermined charge level C-2, then the batteries 1014 may supply motive power to the motors 70 and 1008 and the genset 1010 may be off or idling. If the batteries 1014 have a charge level at or below the predetermined charge level C-2, the genset may be run at a second capacity G-2. The batteries 1014 may begin to charge immediately or the batteries 1014 may wait until the consist 10 attains an approximately steady state speed before charging.

In throttle position 3, the first engine 30 may be off or idling. Motive power to the motors 70 and 1008 may be thus supplied by the batteries 1014 and/or the genset 1010. If the batteries 1014 have a charge level above a predetermined charge level C-3, then the batteries 1014 may supply motive power to the motors 70, 1008 in addition to the genset 1010, which may run at a third capacity G-3. If the batteries 1014 have a charge level at or below the predetermined charge level C-3, the genset may run at a fourth capacity G-4. The batteries 1014 may begin to charge immediately or the batteries 1014 may wait until the consist 10 attains an approximately steady state speed before charging.

In throttle position 4, motive power to the motors 70 and 1008 may be supplied by the first engine 30, and the genset 1010. The first engine 30 may run at a first capacity, E-1. The genset 1010 may run at a fifth capacity G-5. If the batteries 1014 have a charge level at or below a predetermined charge level C-4, then the batteries may be charged. The batteries 1014 may begin to charge immediately or the batteries 1014 may wait until the consist 10 attains an approximately steady state speed before charging.

In throttle position 5, motive power to the motors 70 and 1008 may be supplied by the first engine 30, and the genset 1010. The first engine 30 may run at a second capacity, E-2. The genset 1010 may run at the fifth capacity G-5. If the batteries 1014 have a charge level at or below a predetermined charge level C-4, then the batteries may be charged. The batteries 1014 may begin to charge immediately or the batteries 1014 may wait until the consist 10 attains an approximately steady state speed before charging.

In throttle position 6, motive power to the motors 70, 1008 may be supplied by the first engine 30, and the genset 1010. The first engine 30 may run at a third capacity, E-3. The genset 1010 may run at the fifth capacity G-5. If the batteries 1014 have a charge level at or below a predetermined charge level C-4, then the batteries may be charged. The batteries 1014 may begin to charge immediately or the batteries 1014 may wait until the consist 10 attains an approximately steady state speed before charging.

According to various embodiments: C-1 may be less than (according to some embodiments) or equal to (according to other embodiments) C-2. C-2 may be less than (according to some embodiments) or equal to (according to other embodiments) C-3. C-3 may be less than (according to some embodiments) or equal to (according to other embodiments) C-4.

According to various embodiments: G-1 may be less than (according to some embodiments) or equal to (according to other embodiments) G-2. G-2 may be less than (according to some embodiments) or equal to (according to other embodiments) G-3. G-3 may be less than (according to some embodiments) or equal to (according to other embodiments) G-4. G-4 may be less than (according to some embodiments) or equal to (according to other embodiments) G-5. According to some embodiments, G-5 is a maximum capacity of the genset 1010. According to some embodiments, both G-4 and G-5 are the same maximum capacity of the genset 1010.

According to various embodiments: E-1 may be less than (according to some embodiments) or equal to (according to other embodiments) E-2. E-2 may be less than (according to some embodiments) or equal to (according to other embodiments) E-3. According to some embodiments, E-3 may be a maximum capacity of the first engine 30.

Examples of a Method of Manufacturing the Second Vehicle

It should be appreciated that the second vehicle 1000 may be manufactured by retrofitting a provided vehicle including some or all of the features of the first vehicle 100. The provided vehicle may include an engine that combusts diesel fuel, a generator linked to the engine, a plurality of wheel motors, a plurality of wheels, and a braking system. The provided vehicle may further include an air compressor configured to supply compressed air to the braking system.

The method of retrofitting may include stripping out the engine and the generator of the primary locomotive and replacing the stripped components with the genset 1010. The method may include leaving the wheel motors and the wheels of the provided locomotive intact (or may include stripping one or both of the motors and the wheels of the provided locomotive out and replacing them with new motors and wheels). The method may include providing the batteries 1014 and the NG cylinders 1012. The method may include disposing the batteries 1014 and the NG cylinders according to the locations described above.

The method may include adding one or more fluid lines that link the one or more NG cylinders 1012 to the genset 1010. The method may include electrically linking the one or more batteries 1014 to the wheel motors. The method may include constructing some or all of the compartments, vents, and the ducts to the locomotive. The method may include configuring the provided vehicle to include some or all of the features of the second vehicle 1000.

EXAMPLE ADDITIONAL EMBODIMENTS

According to some embodiments, the first vehicle 100 and the second vehicle 1000 may be integrated into a single vehicle (e.g., a ship, a single locomotive). According to some embodiments, the first vehicle 100 is a first truck and the second vehicle 1000 is a second truck or a trailer coupled or linked to a first truck.

Although the first engine 30 was described as running on diesel fuel, the first engine 30 may run on any suitable energy source (e.g., any heavy fuel, any light fuel (e.g., gasoline), fuel cells, biogas, hydrogen, compressed natural gas (CNG), liquefied natural gas (LNG), Dimethyl Ether (DME), propane, a syngas, any combination thereof, etc.). According to certain preferred embodiments, the first engine 30 runs on high-density energy sources, such as heavy fuels including diesel fuel, fuel oil (e.g., Bunker C), and gasoline.

Although the genset 1010 was described as running on compressed natural gas, the genset may run on any suitable clean energy source (e.g., any heavy fuel, any light fuel (e.g., gasoline), fuel cells, biogas, hydrogen, CNG, LNG, DME, propane, a syngas, any combination thereof, etc.). According to some embodiments, the CNG is a mixture of compressed natural gas and one or more other substances (e.g., hydrogen gas). According to certain preferred embodiments, the genset 1010 runs on a clean energy source (e.g., CNG, LNG, fuel cells, propane, syngas, any combination thereof).

The first vehicle 100 and the second vehicle 1000 may be reconfigured according to their respective fuel sources. For example, when the first engine 30 runs on gasoline, the fuel tank 200 is a gasoline fuel tank. When the genset runs on LNG, the cylinders 1012 may be LNG cylinders. When the first vehicle 100 is reconfigured with a different fuel source, some or all of the components of the first vehicle 100 may remain constant except for the first engine 30 and/or the fuel tank 210. When the second vehicle 1000 is reconfigured with a different fuel source, some or all of the components of the second vehicle 1000 may remain constant except for the genset 1010 and the cylinders 1012.

It should be appreciated that the cylinders 1012 represent a fuel source for the genset 1010 and thus can be any suitable configuration (e.g., a box-shaped tank instead of cylinders). It should be appreciated that when the present disclosure refers to natural gas, such natural gas may be any form of natural gas (e.g., CNG or LNG).

According to various embodiments, the genset 1010 may include a plurality of gensets 1010, configured to supply electrical energy to the second electrical bus 1050 in parallel. According to various embodiments, one of the first air compressor 140 or the second air compressor 1016 may be configured to turn off depending on the selected mode and/or the selected throttle position such that only one of the first air compressor or the second air compressor 1016 supplies braking power to both of the first vehicle 100 and the second vehicle 1000. According to various embodiments, either or both of the first air compressor 140 and the second air compressor 1016 may include a plurality of air compressors running in-series or in-parallel.

According to various embodiments, one or both of the first air compressor 140 and the second air compressor 1016 are mechanically, instead of electrically, powered. For example, the first air compressor 140 may be mechanically driven by the first engine 30 and the second air compressor 1016 may be mechanically driven by the genset 1010. One or both of the first air compressor 140 and the second air compressor 1016 may include a dehydration and oil filtration system. The first air compressor 140 may share oil with the first engine 30. The second air compressor 1016 may share oil with the genset 1010. According to some embodiments, the second air compressor 1016 is housed in the genset compartment 1020. The air compressors 140 and 1016 may be any suitable air compressors such as reciprocating piston, rotary screw/scroll, etc.

According to various embodiments, heat produced by the first engine 30 and/or the genset 1010 may be used to preheat the fuel flowing from the cylinders 1012 before the fuel reaches the genset 1010. According to some embodiments, heat from the exhaust of the first engine 30 and/or the genset 1010 is used to perform the preheating. According to some embodiments, an exhaust line leading from the genset 1010 to the second vent 1032 is in fluid communication with a jacket surrounding a perimeter of the fluid delivery line 1018.

The batteries 1014 may include one or more batteries. The batteries 1014 may be Lead-Acid, Li-Ion, Metal-Air, Ni—Cd, or Li-Polymer batteries. According to some embodiments, the batteries 1014 are low power batteries such as Lithium Nickel Manganese Cobalt Oxide, or Lithium Nickel Aluminum Oxide batteries. The batteries 1014 may include one or more ultracapacitors in some embodiments. According to some embodiments, the batteries of the hybrid energy recovery system 1048 are high power batteries such as Li-Ion or Lithium Titanium Oxide batteries that can tolerate a large number of cycles at high levels of charging and discharging. According to some embodiments, batteries 1014 are configured to store a larger amount of energy than the batteries of the hybrid energy recovery system 1048. According to some embodiments, the batteries of the hybrid energy recovery system 1048 are configured to charge and discharge at a faster rate than batteries 1014.

According to some embodiments, when the first engine 30 is off and/or idling, power provided by the second vehicle 1000 to the first electrical bus 60 powers one or more resistance heaters configured to heat oil and/or water circuits passing through the first engine 30. The first computing system 3000*a* may be configured to actuate the resistance heaters to maintain the oil at a first temperature and to maintain the water at a second temperature. When the first engine 30 is idling and/or running, the first computing system 3000*a* may be configured to turn off the resistance heaters.

As stated above, the genset 1010 may be configured to run on fuel cells. According to some embodiments, the genset 1010 is a thermoelectric generator. According to some embodiments, the second vehicle 1000 includes an advanced emissions reduction system. The emissions reduction system may include a 3-stage or a 4-stage 3-way catalyst, enabling NOx emissions levels of 0.02 g/bhp-hr.

According to some embodiments, the second electrical bus 1050 carries direct current (DC), as opposed to alternating current, so that power from the batteries 1014 does not experience two inverter passes. A DC/DC voltage converter may be located between the batteries 1014 and the second electrical bus 1050

According to some embodiments, the second vehicle may lack cylinders 1012 and rely on a dual-fuel tank for a light fuel supply such as a natural gas supply. According to these embodiments, each of the couplers 104 and 1004 include a light fuel connection line such as a natural gas connection line.

Example Dual-Fuel Embodiments

According to some embodiments, the first engine 30 is a dual-fuel first engine 30 and the tank 200 is a dual-fuel tank 2000. As with all features disclosed in this application, the features of the dual-fuel tank 30 and the dual-fuel first engine 30 are optional. As stated above, according to some embodiments, the first engine 30 is a diesel-only engine and the tank 200 is a diesel-only tank.

FIG. 2 illustrates the dual-fuel tank 200 being mounted to the first vehicle 100. As shown in FIG. 2, the dual-fuel tank 200 may include a first fuel line 120 that supplies one of NG or diesel fuel from tank 200 to dual-fuel engine 30 and a second fuel line 130 that supplies the other of NG or diesel fuel from tank 200 to dual-fuel engine 30. One or both of the fuel lines 120, 130 may include an electric heating jacket 750.

Figure 10:
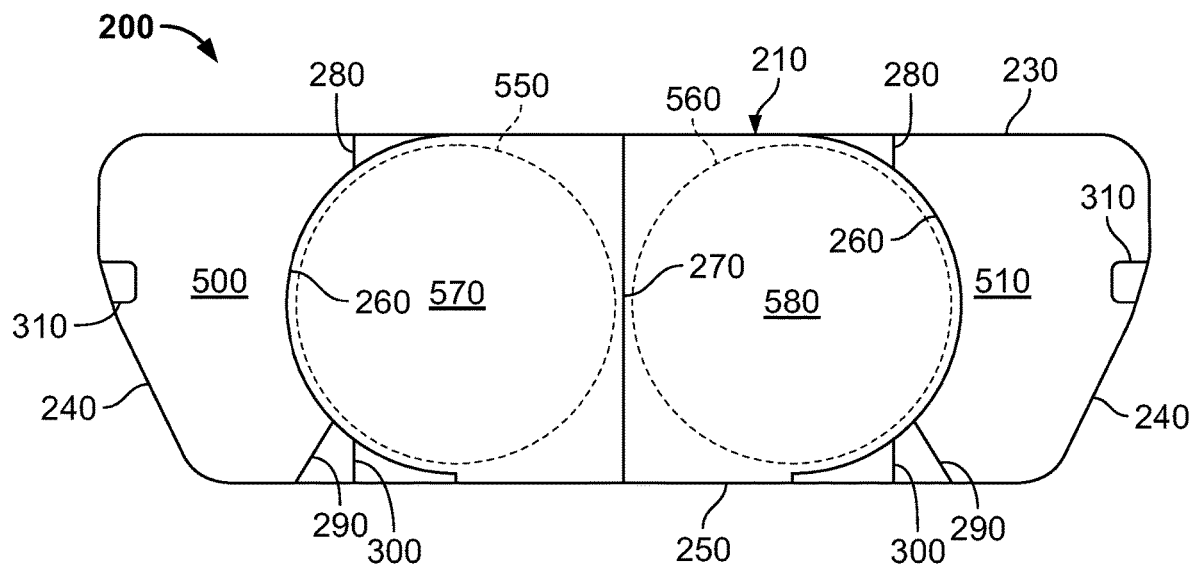
FIG. 10 is a front elevational view of at least a portion of a dual-fuel tank for the first vehicle of one example embodiment of the present disclosure.
Figure 11:
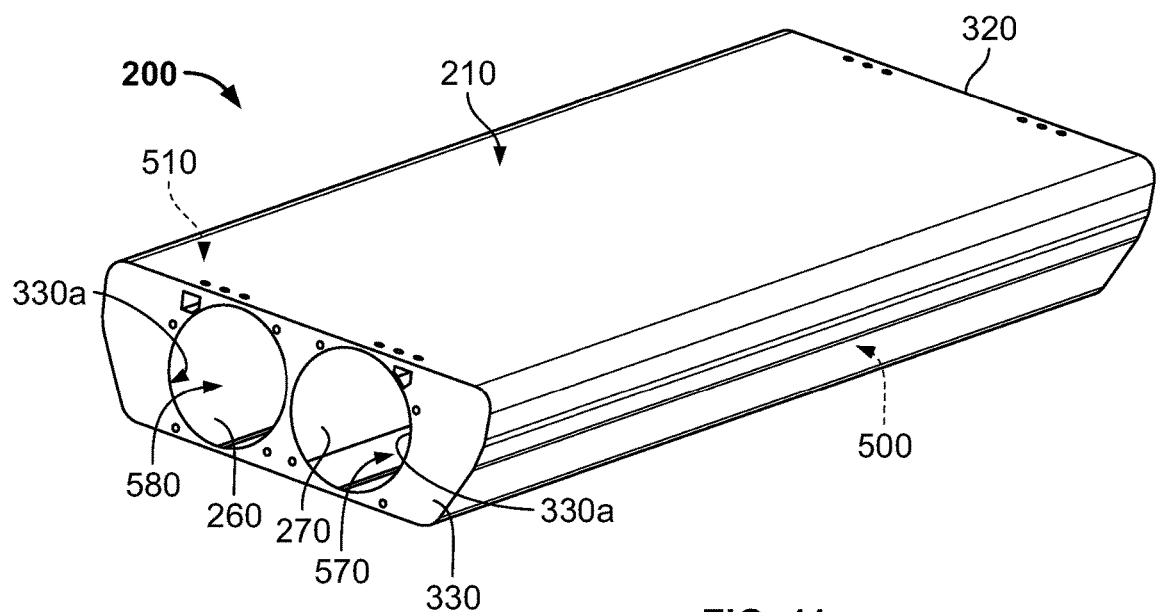
FIG. 11 is a front isometric view of at least a portion of the dual-fuel tank for the first vehicle of one example embodiment of the present disclosure.

As shown in FIGS. 2, 10, and 11, the dual-fuel tank 200 (i.e., the tank) may include a frame 210 that enables the tank 200 to mount to the chassis 20 of the locomotive 1020. The tank 200 may be configured to store two diverse fluids (e.g., diesel fuel and compressed or liquefied natural gas). Top, side, bottom, and end plates 230, 240, 250, 260, 270, 320, and 330 may define two diesel fuel vessels 500, 510, that generally each have the shape shown in FIGS. 10 and 11. Vessels 500 and 510 may be fluidly connected to each other or may be fluidly isolated from each other.

As shown in FIGS. 10 and 11, vessels 500 and 510 may be shaped to occupy the spaces between each of vessels 550 and 560 and the outer envelope of the tank 200. According to various embodiments, vessels 500 and 510 collectively have a diesel fuel capacity of at least 500, 750, 1,000, 1,250, 1,500, 2,000, 2,500, and/or 3,000 gallons. According to various embodiments, vessels 500, 510 collectively have a diesel fuel capacity of less than 20,000, 10,000, 9,000, 8,000, 7,000, 6,000, 5,000, 4,000, 3,000, 2,500, 2,250, and/or 2,000 gallons.

The dual-fuel tank 200 may include two pressurized light fuel vessels such as natural gas vessels 550 and 560 that are inserted into central spaces 570 and 580 in the frame 210 via openings 330a in the end plate 330. Vessels 550 and 560 may be bolted or otherwise attached to the fixed-end end plate 320. As shown in FIGS. 10 and 11, vessels 500 and 510 may extend generally outward (i.e., relative to the lateral center-line of the locomotive 1020 that is generally co-planar with the central plate 270) farther than the laterally-outward-most portion of vessels 550 and 560.

Vessels 550 and 560 may be any type of vessel that is suitable for storing a fuel. For example, vessels 550 and 560 may include compressed/pressurized natural gas vessels. Such compressed natural gas vessels may comprise any suitable material (e.g., steel, fiberglass, carbon fiber, etc.) and have any suitable shape (e.g., elongated cylinders with rounded ends). According to various embodiments, vessels 550 and 560 are generally cylindrical and have a diameter between 24 and 40 inches, e.g., 36 inches.

The tank 200 may be configured to withstand significant side impacts without rupturing diesel vessels 500 and 510 or the NG vessels 550 and 560. According to various embodiments, the NG vessels 550, 560 are disposed laterally inwardly from the diesel vessels 500, 510 (see FIG. 10). As a result, side impacts on the tank 200 will be absorbed by the diesel vessels 500 and 510 (and the fuel therein) and frame 210. This absorption mitigates side-impact trauma experienced by the NG vessels 550 and 560.

According to various embodiments, disposing the NG vessels 550 and 560 in a more laterally central location than the diesel vessels 500 and 510, the tank 200 may be able to withstand larger side impact loads without rupturing the vessels 550 and 560 than would otherwise be possible. Additional strengthening members (e.g., side supports 310, ribs 280, 290, and 300) may be added to the frame 210 of the tank 200 to further improve tank 200 resistance to side impacts.

The dual-fuel first engine 30 may be configured to combust a combination of natural gas and diesel fuel. Additional features of the dual-fuel tank 200 and the dual-fuel first engine 30 are described in U.S. patent application Ser. No. 15/188,603, which is hereby incorporated by reference in its entirety.

SUMMARY OF SOME EXEMPLARY EMBODIMENTS

It should be appreciated that one of many embodiments of the present disclosure may include a vehicle comprising: a genset including: an engine configured to combust light fuel such as natural gas; a generator linked to the engine and configured to convert mechanical energy provided by the engine into electrical energy; one or more light fuel storage containers; one or more electrical storage devices such as batteries; a plurality of wheels; a plurality of electric motors configured to drive the plurality of wheels; a first power bus configured to electrically connect the generator of the genset, the one or more electrical storage devices, and the plurality of electric motors; wherein the one or more electrical storage devices are disposed lower than the one or more light fuel storage containers with respect to a vertically extending reference axis that is perpendicular to a reference plane parallel with ground.

The one or more electrical storage devices may be disposed below the one or more light fuel storage containers.

The one or more electrical storage devices may be located closer to each of the plurality of wheels than the one or more light fuel storage containers.

The vehicle may include a first compartment, a second compartment, and a third compartment. The first compartment may house the genset. The second compartment may house the one or more light fuel storage containers, and the third compartment may house the one or more electrical storage devices. The second compartment may be higher than the third compartment with respect to the vertically extending reference axis.

The vehicle may include a second compartment vent disposed at a vertical apex of the second compartment.

The vehicle may include a first duct configured to fluidly communicate the first compartment with the third compartment.

The vehicle may include a fourth compartment, a second duct, and a third duct. The second duct may be configured to fluidly communicate the fourth compartment with the third compartment. The third duct may be configured to fluidly communicate the fourth compartment with the second compartment. Each of the first, second, and third ducts may be independently electronically controllable to an open position and a closed position.

The vehicle may not include a duct configured to directly fluidly communicate the second compartment with the third compartment.

The vehicle may include at least one venting line and at least one pressure relief vent. The at least one venting line may extend from the one or more light fuel storage containers to the pressure relief vent.

The one or more light fuel storage containers may be one or more light fuel cylinders configured to store at least one of compressed light fuel such as natural gas and liquefied natural gas. Each of the one or more light fuel cylinders may include a first end and an opposing second end. Each of the one or more first ends may be located at least four meters from the closest unprotected electrical connection. The four meters may be measured along a shortest unobstructed fluid flow path between the one or more first ends and the closest unprotected electrical connection. Each of the one or more second ends may be located at least four meters from the closest unprotected electrical connection. The four meters may be measured along a shortest unobstructed fluid flow path between the one or more second ends and the closest unprotected electrical connection. Each joint between the at least one venting line and the one or more light fuel cylinders may be located at least four meters from the closest unprotected electrical connection. The four meters may be measured along a shortest unobstructed fluid flow path between each joint and the closest unprotected electrical connection.

The genset, the one or more electrical storage devices, the plurality of electric motors, and the first power bus may be configured such that the genset is capable of powering the plurality of electric motors while charging the one or more electrical storage devices.

The vehicle may include at least one coupler for electrically communicating the first power bus with a second power bus of a separate vehicle. The at least one coupler may be configured to connect to the first power bus. The at least one coupler may have an electrical bandwidth sized to accommodate and accept an energy flow, from the separate vehicle, corresponding to a sum of a maximum capacity of each of the plurality of electrical wheel motors.

The at least one coupler may include a data connection for accepting throttle commands from the separate vehicle.

The vehicle may not include an operator booth and may not include a throttle.

It should be appreciated that one of many embodiments of the present disclosure may include a system of coupled locomotives comprising: (a) a first vehicle comprising: a genset including a first engine configured to combust light fuel such as natural gas and a first generator linked to the first engine and configured to convert mechanical energy provided by the first engine into electrical energy; one or more light fuel storage containers; one or more electrical storage devices such as batteries; a plurality of first wheels; a plurality of first electric motors configured to drive the plurality of first wheels; a first coupler; a first power bus configured to electrically connect the first generator of the genset, the one or more electrical storage devices, the plurality of first electric motors, and the first coupler; wherein the one or more electrical storage devices are disposed lower than the one or more light fuel storage containers with respect to a vertically extending reference axis that is perpendicular to reference plane parallel with ground; and (b) a second vehicle comprising: a second engine configured to combust a heavy fuel such as diesel fuel; a second generator linked to the second engine and configured to convert mechanical energy provided by the second engine into electrical energy; a plurality of second wheels; a plurality of second electric motors configured to drive the plurality of second wheels; a second power bus configured to electrically connect the second generator, the plurality of second electric motors, and the second coupler; wherein the first coupler is connected to the second coupler, thus electrically connecting the first power bus with the second power bus.

The system may include a throttle configured to enable user selection of one of a plurality of throttle positions. The first vehicle may be configured to control the genset at a capacity corresponding to the selected throttle position and the second vehicle may be configured to control the second engine at a capacity corresponding to the selected throttle position.

The throttle may be housed in the second vehicle and the one or more electrical storage devices may be disposed below the one or more light fuel storage containers.

The system may include a mode selector configured to enable user selection of one of a plurality of modes. The first vehicle may be configured to control the genset based on the selected throttle position and the selected mode and the second vehicle is configured to control the second engine based on the selected throttle position and the selected mode.

The system may include one or more computing systems. The one or more computing systems may be configured to control the genset at a capacity corresponding to the selected throttle position and to control the second engine at a capacity corresponding to the selected throttle position. The one or more computing systems may be configured to (a) control the first engine of the first vehicle to be active and (b) control the second engine of the second vehicle to be inactive upon user selection of any one of a first plurality of throttle positions.

The second engine may include a cooling circuit charged with a liquid. The cooling circuit may include one or more heaters configured to heat the charged liquid. The one or more computing systems may be configured to control the one or more heaters to maintain a temperature of the charged liquid at a predetermined temperature upon user selection of any one of the first plurality of throttle positions.

The system may include a mode selector configured to enable user selection of one of a plurality of modes. Each of the first plurality of throttle positions may correspond to a selected throttle position and a selected mode.

The one or more computing systems may be configured to (a) control the first engine of the first vehicle to be active and (b) control the second engine of the second vehicle to be active upon user selection of any one of a second plurality of throttle positions.

The one or more computing systems may be configured to control the second engine of the second vehicle to operate at maximum capacity upon user selection of any one of the second plurality of throttle positions.

Each of the second plurality of throttle positions may correspond to a different operating capacity of the second engine.

The system may include one or more computing systems. The one or more computing systems may be configured to control the genset and the one or more electrical storage devices at a capacity corresponding to the selected throttle position and to control the second engine at a capacity corresponding to the selected throttle position. The one or more computing systems may be configured to (a) control at least one of the genset and the one or more electrical storage devices to supply electrical current into both of the first power bus and the second power bus and (b) control the second engine of the second vehicle such that the second generator does not supply electrical current into the second power bus upon user selection of any one of a second plurality of throttle positions.

Upon user selection of any one of the second plurality of throttle positions, the one or more computing systems may be configured to cause at least one of the genset and the one or more electrical storage devices to power both of the first electric motors and the second electric motors.

The system may include a mode selector configured to enable user selection of one of a plurality of modes. Each of the second plurality of throttle positions may correspond to a selected throttle position and a selected mode.

It should be appreciated that one of many embodiments of the present disclosure may include a method of retrofitting a vehicle, the method comprising: providing a vehicle including a first engine configured to combust a heavy fuel such as diesel fuel, a first generator, a plurality of wheels, and a plurality of motors configured to drive the plurality of wheels; removing the first engine and the first generator from the vehicle; adding a genset including: a first engine configured to combust light fuel such as natural gas and a first generator linked to the engine and configured to convert mechanical energy provided by the engine into electrical energy; adding one or more light fuel storage containers; adding one or more electrical storage devices such as batteries; disposing the one or more light fuel storage containers and the one or more electrical storage devices such that each of the one or more electrical storage devices are disposed lower than each of the one or more light fuel storage containers with respect to a vertically extending reference axis that is perpendicular to a reference plane parallel with ground; and configuring a power bus to electrically link the first generator of the genset, the one or more electrical storage devices, the plurality of electric motors, and a coupler.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A vehicle comprising:
 a genset including: (a) an engine configured to combust a light fuel; and (b) a generator linked to the engine and configured to convert mechanical energy provided by the engine into electrical energy;
 one or more light fuel storage containers;
 one or more electrical storage devices;
 a plurality of wheels;
 a plurality of electric motors configured to drive the plurality of wheels;
 a first power bus configured to electrically connect the generator of the genset, the one or more electrical storage devices, and the plurality of electric motors;
 a first compartment housing the genset;
 a second compartment housing the one or more light fuel storage containers; and
 a third compartment housing the one or more electrical storage devices;
 wherein the one or more electrical storage devices are disposed lower than the one or more light fuel storage containers with respect to a vertically extending reference axis that is perpendicular to a reference plane parallel with ground and wherein the second compartment is higher than the third compartment with respect to the vertically extending reference axis.

2. The vehicle of claim 1, wherein the one or more electrical storage devices are disposed below the one or more light fuel storage containers.

3. The vehicle of claim 1, wherein the one or more electrical storage devices are located closer to each of the plurality of wheels than the one or more light fuel storage containers.

4. The vehicle of claim 1, further including a second compartment vent disposed at a vertical apex of the second compartment.

5. The vehicle of claim 1, further including a first duct configured to fluidly communicate the first compartment with the third compartment.

6. The vehicle of claim 5, further including a fourth compartment, a second duct, and a third duct; wherein the second duct is configured to fluidly communicate the fourth compartment with the third compartment and the third duct is configured to fluidly communicate the fourth compartment with the second compartment, and each of the first, second, and third ducts are independently electronically controllable to an open position and a closed position.

7. The vehicle of claim 5, which does not include a duct configured to directly fluidly communicate the second compartment with the third compartment.

8. The vehicle of claim 1, further including at least one venting line and at least one pressure relief vent, the at least one venting line extending from the one or more light fuel storage containers to the pressure relief vent.

9. The vehicle of claim 8, wherein the one or more light fuel storage containers are one or more light fuel cylinders configured to store at least one of compressed natural gas and liquefied natural gas, each of the one or more natural gas cylinders includes a first end and an opposing second end; wherein each of the one or more first ends are located at least four meters from the closest unprotected electrical connection, the four meters being measured along a shortest unobstructed fluid flow path between the one or more first ends and the closest unprotected electrical connection; wherein each of the one or more second ends are located at least four meters from the closest unprotected electrical connection, the four meters being measured along a shortest unobstructed fluid flow path between the one or more second ends and the closest unprotected electrical connection; and wherein each joint between the at least one venting line and the one or more light fuel cylinders is located at least four meters from the closest unprotected electrical connection, the four meters being measured along a shortest unobstructed fluid flow path between each joint and the closest unprotected electrical connection.

10. The vehicle of claim 1, wherein the genset, the one or more electrical storage devices, the plurality of electric motors, and the first power bus are configured such that the genset is capable of powering the plurality of electric motors while charging the one or more electrical storage devices.

11. The vehicle of claim 1, further including at least one coupler for electrically communicating the first power bus with a second power bus of a separate vehicle, the at least one coupler being configured to connect to the first power bus, the at least one coupler having an electrical bandwidth sized to accommodate and accept an energy flow, from the separate vehicle, corresponding to a sum of a maximum capacity of each of the plurality of electrical wheel motors.

12. The vehicle of claim 11, wherein the at least one coupler includes a data connection for accepting throttle commands from the separate vehicle.

13. The vehicle of claim 1, which does not include an operator booth and does not include a throttle.

14. A system of coupled locomotives comprising:
(a) a first vehicle comprising:
a genset including: (i) a first engine configured to combust light fuel; (ii) a first generator linked to the first engine and configured to convert mechanical energy provided by the first engine into electrical energy;
one or more light fuel storage containers;
one or more electrical storage devices;
a plurality of first wheels;
a plurality of first electric motors configured to drive the plurality of first wheels;
a first coupler; and
a first power bus configured to electrically connect the first generator of the genset, the one or more electrical storage devices, the plurality of first electric motors, and the first coupler;
wherein the one or more electrical storage devices are disposed lower than the one or more light fuel storage containers with respect to a vertically extending reference axis that is perpendicular to reference plane parallel with ground;
(b) a second vehicle comprising:
a second engine configured to combust heavy fuel;
a second generator linked to the second engine and configured to convert mechanical energy provided by the second engine into electrical energy;
a second coupler;
a plurality of second wheels;
a plurality of second electric motors configured to drive the plurality of second wheels; and
a second power bus configured to electrically connect the second generator, the plurality of second electric motors, and the second coupler;
wherein the first coupler is connected to the second coupler, thus electrically connecting the first power bus with the second power bus;
one of the first vehicle and the second vehicle including a throttle configured to enable user selection of one of a plurality of throttle positions, wherein the first vehicle is configured to control the genset at a capacity corresponding to the selected throttle position, and wherein the second vehicle is configured to control the second engine at a capacity corresponding to the selected throttle position; and
one of the first vehicle and the second vehicle including a mode selector configured to enable user selection of one of a plurality of modes, wherein the first vehicle is configured to control the genset based on the selected throttle position and the selected mode, and wherein the second vehicle is configured to control the second engine based on the selected throttle position and the selected mode.

15. The system of claim 14, wherein the throttle is housed in the second vehicle and the one or more electrical storage devices are disposed below the one or more light fuel storage containers.

16. The system of claim 14, further including one or more computing systems, the one or more computing systems configured to control the genset at a capacity corresponding to the selected throttle position and to control the second engine at a capacity corresponding to the selected throttle position, wherein the one or more computing systems are configured to: (a) control the first engine of the first vehicle to be active, and (b) control the second engine of the second vehicle to be inactive upon user selection of any one of a first plurality of throttle positions.

17. The system of claim 16, wherein the second engine includes a cooling circuit charged with a liquid, the cooling circuit including one or more heaters configured to heat the charged liquid; wherein the one or more computing systems are configured to control the one or more heaters to maintain a temperature of the charged liquid at a predetermined temperature upon user selection of any one of the first plurality of throttle positions.

18. The system of claim 17, wherein each of the first plurality of throttle positions corresponds to a selected throttle position and a selected mode.

19. The system of claim 16, wherein the one or more computing systems are configured to: (a) control the first engine of the first vehicle to be active, and (b) control the second engine of the second vehicle to be active upon user selection of any one of a second plurality of throttle positions.

20. The system of claim 19, wherein the one or more computing systems are configured to control the second engine of the second vehicle to operate at maximum capacity upon user selection of any one of the second plurality of throttle positions.

21. The system of claim 19, wherein each of the second plurality of throttle positions corresponds to a different operating capacity of the second engine.

22. The system of claim 14, further including one or more computing systems, the one or more computing systems configured to control the genset and the one or more electrical storage devices at a capacity corresponding to the selected throttle position and to control the second engine at a capacity corresponding to the selected throttle position, wherein the one or more computing systems are configured to: (a) control at least one of the genset and the one or more electrical storage devices to supply electrical current into both of the first power bus and the second power bus, and (b) control the second engine of the second vehicle such that the second generator does not supply electrical current into the second power bus upon user selection of any one of a second plurality of throttle positions.

23. The system of claim 22, wherein, responsive to user selection of any one of the second plurality of throttle positions, the one or more computing systems are configured to cause at least one of the genset and the one or more electrical storage devices to power both of the first electric motors and the second electric motors.

24. The system of claim 23, wherein each of the second plurality of throttle positions corresponds to a selected throttle position and a selected mode.

25. A method of retrofitting a vehicle, the method comprising:
providing a vehicle including a first engine configured to combust heavy fuel, a first generator, a plurality of wheels, and a plurality of motors configured to drive the plurality of wheels;
removing the first engine and the first generator from the vehicle;
adding a genset in a first compartment housing and including:
a first engine configured to combust light fuel;
a first generator linked to the engine and configured to convert mechanical energy provided by the engine into electrical energy;

adding one or more light fuel storage containers in a second compartment housing;

adding one or more electrical storage devices in a third compartment housing;

disposing the one or more light fuel storage containers and the one or more electrical storage devices such that each of the one or more electrical storage devices are disposed lower than each of the one or more light fuel storage containers with respect to a vertically extending reference axis that is perpendicular to a reference plane parallel with ground, and wherein the second compartment is higher than the third compartment with respect to the vertically extending reference axis; and configuring a power bus to electrically link the first generator of the genset, the one or more electrical storage devices, the plurality of electric motors, and a coupler configured to couple with a reciprocal coupler of a different vehicle.

26. A system of coupled locomotives comprising:
(a) a first vehicle comprising:
a genset including:
a first engine configured to combust light fuel;
a first generator linked to the first engine and configured to convert mechanical energy provided by the first engine into electrical energy;
one or more electrical storage devices;
a plurality of first wheels;
a plurality of first electric motors configured to drive the plurality of first wheels;
a first coupler including a first light fuel line for providing light fuel to the first generator; and
a first power bus configured to electrically connect the first generator of the genset, the one or more electrical storage devices, the plurality of first electric motors, and the first coupler;
wherein the one or more electrical storage devices are disposed lower than the genset with respect to a vertically extending reference axis that is perpendicular to reference plane parallel with ground, and wherein the light fuel line is higher than the one or more electrical storage devices with respect to the vertically extending reference axis; and
(b) a second vehicle comprising:
a second engine configured to combust heavy fuel;
a second generator linked to the second engine and configured to convert mechanical energy provided by the second engine into electrical energy;
a dual-fuel tank including a first compartment storing heavy fuel and a second compartment storing light fuel;
a plurality of second wheels;
a second coupler including a second light fuel line for supplying light fuel from the second compartment of the dual-fuel tank to the first coupler;
a plurality of second electric motors configured to drive the plurality of second wheels; and
a second power bus configured to electrically connect the second generator, the plurality of second electric motors, and the second coupler;

wherein the first coupler is connected to the second coupler, thus electrically connecting the first power bus with the second power bus and fluidly connecting the first light fuel line with the second light fuel line.

27. A system of coupled locomotives comprising:
(a) a first vehicle comprising:
a genset including: (i) a first engine configured to combust light fuel; (ii) a first generator linked to the first engine and configured to convert mechanical energy provided by the first engine into electrical energy;
one or more light fuel storage containers;
one or more electrical storage devices;
a plurality of first wheels;
a plurality of first electric motors configured to drive the plurality of first wheels;
a first coupler; and
a first power bus configured to electrically connect the first generator of the genset, the one or more electrical storage devices, the plurality of first electric motors, and the first coupler;
wherein the one or more electrical storage devices are disposed lower than the one or more light fuel storage containers with respect to a vertically extending reference axis that is perpendicular to reference plane parallel with ground;
(b) a second vehicle comprising:
a second engine configured to combust heavy fuel;
a second generator linked to the second engine and configured to convert mechanical energy provided by the second engine into electrical energy;
a second coupler;
a plurality of second wheels;
a plurality of second electric motors configured to drive the plurality of second wheels; and
a second power bus configured to electrically connect the second generator, the plurality of second electric motors, and the second coupler;
wherein the first coupler is connected to the second coupler, thus electrically connecting the first power bus with the second power bus;
one of the first vehicle and the second vehicle including a throttle configured to enable user selection of one of a plurality of throttle positions, wherein the first vehicle is configured to control the genset at a capacity corresponding to the selected throttle position, and wherein the second vehicle is configured to control the second engine at a capacity corresponding to the selected throttle position; and
one or more computing systems configured to control the genset at a capacity corresponding to the selected throttle position and to control the second engine at a capacity corresponding to the selected throttle position, wherein the one or more computing systems are configured to: (a) control the first engine of the first vehicle to be active, and (b) control the second engine of the second vehicle to be inactive upon user selection of any one of a first plurality of throttle positions.

* * * * *